(12) United States Patent
Miyazawa

(10) Patent No.: US 9,323,705 B2
(45) Date of Patent: Apr. 26, 2016

(54) INPUT OUTPUT CONTROL DEVICE, INFORMATION PROCESSING SYSTEM, AND COMPUTER-READABLE RECORDING MEDIUM HAVING STORED THEREIN LOG COLLECTION PROGRAM

(71) Applicant: FUJITSU LIMITED, Kawasaki-shi, Kanagawa (JP)

(72) Inventor: Kazuyoshi Miyazawa, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 328 days.

(21) Appl. No.: 14/032,726

(22) Filed: Sep. 20, 2013

(65) Prior Publication Data

US 2014/0025861 A1    Jan. 23, 2014

Related U.S. Application Data

(63) Continuation of application No. PCT/JP2011/056707, filed on Mar. 22, 2011.

(51) Int. Cl.
| | |
|---|---|
| *G06F 13/00* | (2006.01) |
| *G06F 3/00* | (2006.01) |
| *G06F 15/173* | (2006.01) |
| *H04L 12/66* | (2006.01) |
| *G06F 11/00* | (2006.01) |
| *G06F 12/14* | (2006.01) |

(Continued)

(52) U.S. Cl.
CPC ........ *G06F 13/4022* (2013.01); *G06F 11/0709* (2013.01); *G06F 11/0769* (2013.01)

(58) Field of Classification Search
CPC ............ H04L 63/1425; H04L 63/1408; H04L 63/1416; H04L 41/22; H04L 63/145; H04L 2463/146; G06F 21/552; G06F 3/1273; G06F 11/3055; G06F 2201/88
USPC ............. 710/15, 316; 709/224, 223; 370/352; 726/22, 23

See application file for complete search history.

(56) References Cited

U.S. PATENT DOCUMENTS 3,638,195 A * 1/1972 Brender ................ G06F 15/167
                                                  709/212
5,748,882 A * 5/1998 Huang ................ G06F 11/0715
                                                  709/224

(Continued)

FOREIGN PATENT DOCUMENTS

| | | |
|---|---|---|
| JP | 48-71155 | 9/1973 |
| JP | 4-336636 | 11/1992 |

(Continued)

OTHER PUBLICATIONS

International Search Report mailed May 24, 2011 in corresponding International Application No. PCT/JP2011/056707.

*Primary Examiner* — Faisal M Zaman
(74) *Attorney, Agent, or Firm* — Staas & Halsey LLP

(57) ABSTRACT

An input output (IO) control device connects a plurality of devices with each other, and includes a plurality of ports to which the plurality of devices are connected and a control unit that controls the plurality of ports with each other, and the control unit collects a log of a the collection target port designated by a log collection instruction among the plurality of ports when the log collection instruction is received from any one of the plurality of devices through a first port to which the corresponding device is connected among the plurality of ports.

16 Claims, 21 Drawing Sheets

(51) Int. Cl.
  *G06F 12/16* (2006.01)
  *G08B 23/00* (2006.01)
  *G06F 13/40* (2006.01)
  *G06F 11/07* (2006.01)

(56) References Cited

U.S. PATENT DOCUMENTS

| | | | |
|---|---|---|---|
| 6,633,905 B1 * | 10/2003 | Anderson | G06F 1/26 709/219 |
| 6,868,445 B1 * | 3/2005 | Chebrolu | H04L 47/125 379/32.04 |
| 7,441,053 B2 * | 10/2008 | Mylly | G06F 9/4411 710/1 |
| 7,451,341 B2 | 11/2008 | Okaki et al. | |
| 7,484,245 B1 * | 1/2009 | Friedman | G06F 21/52 380/283 |
| 7,747,740 B2 * | 6/2010 | Doshi | H04W 24/08 370/349 |
| 2002/0147875 A1 * | 10/2002 | Singh | G06F 13/4217 710/305 |
| 2003/0208590 A1 * | 11/2003 | Childress | H04L 69/40 709/224 |
| 2004/0078720 A1 * | 4/2004 | Ito | G06F 11/008 714/45 |
| 2006/0075156 A1 | 4/2006 | Okaki et al. | |
| 2007/0177523 A1 * | 8/2007 | Nagami | H04L 12/2602 370/252 |
| 2007/0226532 A1 * | 9/2007 | Matsuda | G06F 11/0709 714/4.1 |
| 2008/0209025 A1 * | 8/2008 | Agetsuma | H04L 67/1097 709/223 |
| 2009/0063900 A1 * | 3/2009 | Yoshida | G03G 15/5075 714/20 |
| 2009/0235110 A1 | 9/2009 | Kurokawa | |
| 2010/0210294 A1 * | 8/2010 | Yamaji | H04W 24/08 455/500 |

FOREIGN PATENT DOCUMENTS

| | | |
|---|---|---|
| JP | 2006-107151 | 4/2006 |
| JP | 2006-279328 | 10/2006 |
| JP | 2007-257180 | 10/2007 |
| JP | 2009-223702 | 10/2009 |

* cited by examiner

FIG. 7A

| SOF | DA | SA | LCTL | DATA | CRC | EOF |

FIG. 7B

| SOF | DA | SA | LCTL | DATA | CRC | EOF |
| | CU PORT NUMBER 0xFE | CH PORT NUMBER 0xC0 | LOG COLLECTION INSTRUCTION CODE | 0xC0 0xD1 | | |

FIG. 7C

| SOF | DA | SA | LCTL | DATA | CRC | EOF |
| | CH PORT NUMBER 0xC0 | CU PORT NUMBER 0xFE | LOG COLLECTION RESPONSE CODE | TRACE DATA OF 0xC0 0xD1 | | |

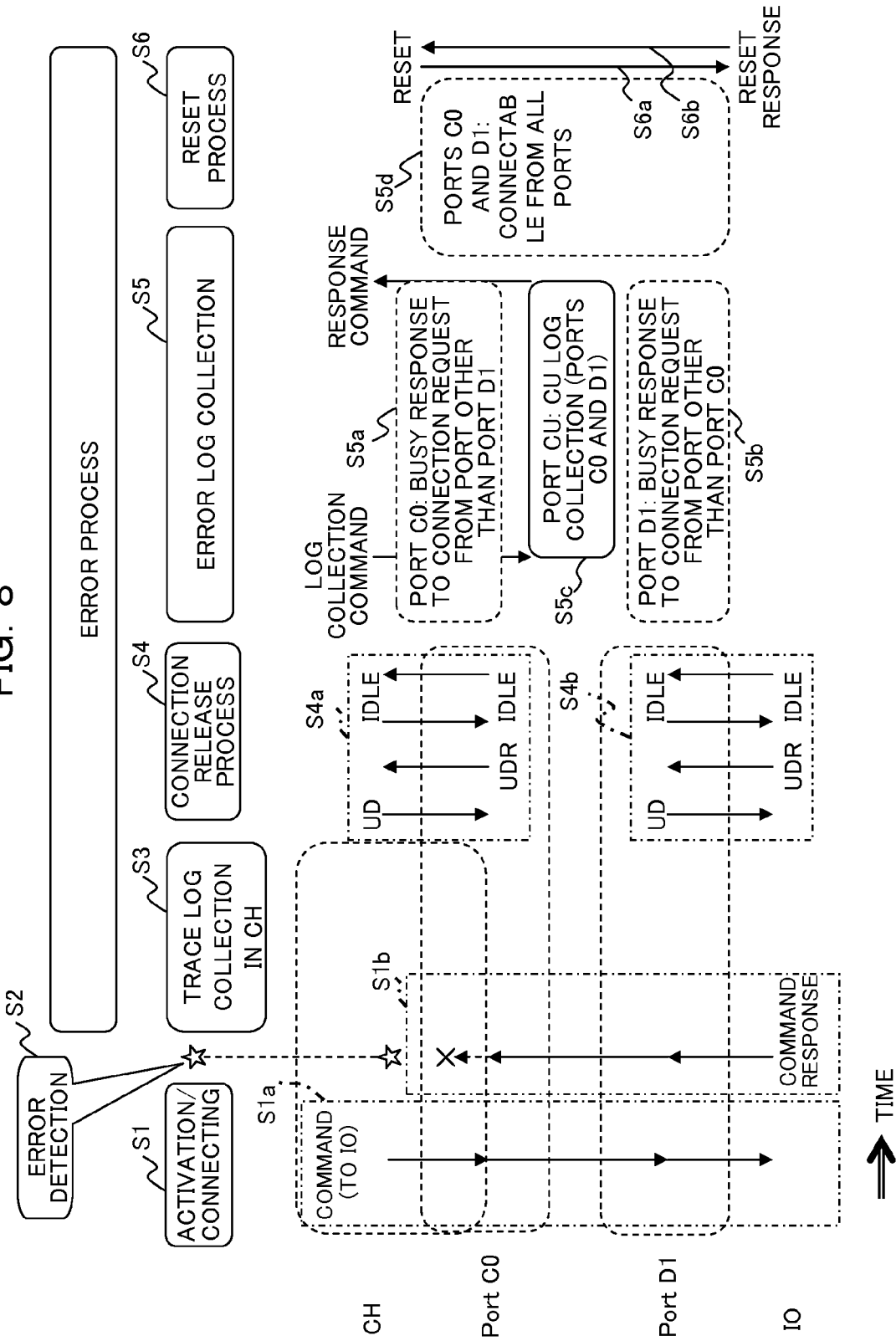

INPUT OUTPUT CONTROL DEVICE, INFORMATION PROCESSING SYSTEM, AND COMPUTER-READABLE RECORDING MEDIUM HAVING STORED THEREIN LOG COLLECTION PROGRAM

CROSS-REFERENCE TO RELATED APPLICATION

This application is a continuation application of International Application No. PCT/JP2011/056707 filed on Mar. 22, 2011 in Japan and designated the U.S., the entire contents of which are hereby incorporated by reference.

FIELD

The present disclosure relates to an input output control device, an information processing system, and a computer-readable recording medium having stored therein a log collection program.

BACKGROUND

In large-scale systems including server devices of a backbone system such as a plurality of mainframes and input output (IO) devices, an IO control device that connects channels of the plurality of mainframes and the IO devices with each other by dynamic switching is sometimes equipped.

FIG. 20 is a diagram illustrating an exemplary configuration of an information processing system 100.

The information processing system 100 illustrated in FIG. 20 includes information processing devices 200-1 and 200-2, IO devices 400-1 and 400-2, and a switch device 500.

The information processing devices 200-1 and 200-2 transmits or receives data or a command to or from the IO devices 400-1 and 400-2 or a control unit 900 via the switch device 500 through channels (denoted by CHs in FIG. 20) 300-1 and 300-2.

Note that, in the example illustrated in FIG. 20, for example, a mainframe (MF) is used as the information processing devices 200-1 and 200-2. Further, various kinds of storage devices including a magnetic disk device such as a hard disk drive (HDD), a semiconductor disk device such as a solid state drive (SSD), or a tape drive, or a console may be used as the IO device 400-1 and 400-2.

The switch device 500 includes external ports 600-1 to 600-4, an internal port 700, a switch unit 800, and a control unit 900.

The external ports 600-1 to 600-4 are connected to channels 300-1 and 300-2 and the IO devices 400-1 and 400-2, respectively. The internal port 700 is equipped in the control unit 900.

Note that, in FIG. 20, the external port 600-1 to which the channel 300-1 is connected is denoted by C0, and the external port 600-2 to which the channel 300-2 is connected is denoted by C1. Further, the external port 600-3 to which the device 400-1 is connected is denoted by D1, the external port 600-4 to which the IO device 400-2 is connected is denoted by D2, and the internal port 700 equipped in the control unit 900 is denoted by FE. In the following description, the external ports 600-1 to 600-4 are referred to as ports C0, C1, D1, and D2, respectively, and the internal port 700 is referred to as a port FE.

The switch unit 800 is connected to the external ports 600-1 to 600-4 and the internal port 700, and manages statuses of the external ports 600-1 to 600-4 and controls a connection relation between arbitrary ports. Through control of a connection relation, the switch unit 800 dynamically switches a connection between the channels 300-1 and 300-2 and the IO devices 400-1 and 400-2, and performs an n-to-n connection (n is an integer of 1 or more).

The control unit 900 is connected with the external ports 600-1 to 600-4 through the internal port 700, and controls configuration control such as online/offline of the external ports 600-1 to 600-4.

The control of the external ports 600-1 to 600-4 by the control unit 900 is performed on a port designated by an instruction given from the information processing device 200-1 or 200-2 or the like based on the instruction. For example, the information processing device 200-1 or 200-2 gives the instruction by issuing a command to the control unit 900 through the external ports 600-1 to 600-4 and the switch unit 800.

Through the switch device 500, in the information processing system 100, a flexible connection between the plurality of information processing devices 200-1 and 200-2 and the plurality of IO devices 400-1 and 400-2 can be made, and the number of channels and the number of connected channels at the time of IO connection can be reduced.

Further, each of the channels 300-1 and 300-2, the external ports 600-1 to 600-4, and the internal port 700 can hold a trace log in its own channel or its own port. The trace log is used for error analysis when an error occurs in the information processing system 100.

An example of an error processing procedure in the information processing system 100 having the above-described configuration will be described below with reference to FIG. 21.

FIG. 21 is a sequence diagram for describing an exemplary error processing procedure in the information processing system 100 illustrated in FIG. 20.

When the channel 300-1 issues a command to the IO device 400-1, the ports C0 and D1 are connected to each other (step S101). In other words, as the command is transmitted from the channel 300-1, the channel 300-1 is connected with the IO device 400-1 through the switch device 500.

In the connection state, for example, when the channel 300-1 detects an error such as an interface control check (ICC) on interaction between the channel 300-1 and the device 400-1 (step S102), content of a trace memory in the channel 300-1 is collected (step S103). The channel 300-1 uses the content of the trace memory as an error log for ICC analysis.

When the content of the trace memory is collected, the channel 300-1 releases (separates) an IO interface between the channel 300-1 and the IO device 400-1 (step S104).

Specifically, the channel 300-1 transmits a command instructing the port C0 to release a connection with the channel 300-1. Upon receiving the command, the port C0 releases a connection between the channel 300-1 and the port C0 (step S104a), and transmits a command instructing the port D1 which is in the connection state with the port C0 to release a connection with the IO device 400-1. Upon receiving the command from the port C0, the port D1 releases a connection between the port D1 and the IO device 400-1 (step S104b).

Even when a connection between the ports C0 and D1 is released in step S104, the channel 300-1 can transmit a next frame to the IO device 400-1.

Note that, since it is difficult for the IO device 400-1 to determine whether the channel 300-1 has detected an error in step S102, the IO device 400-1 recognizes that interaction with the channel 300-1 is continuously being performed. For this reason, the channel 300-1 performs a reset process of resetting the connection with the IO device 400-1 (step S105).

The reset process is performed such that the channel 300-1 instructs the IO device 400-1 to reset, and the device 400-1 that is given the reset instruction resets the connection with the channel 300-1 in the IO device 400-1 (step S105a).

As described above, when the channel 300-1 detects an ICC on the interaction with the IO device 400-1, the error process illustrated in FIG. 21 is performed. The error log collected in the error process is used to specify a suspicious point through ICC analysis, and an administrator or an operator repairs or replaces a specified suspicious point and recovers a failure.

[Patent Literature 1] Japanese Laid-open Patent Publication No. 48-071155
[Patent Literature 2] Japanese Laid-open Patent Publication No. 04-336636
[Patent Literature 3] Japanese Laid-open Patent Publication No. 2009-223702

When an error occurs in the information processing system 100 in which the channel 300 is connected with the IO device 400 through the switch device (IO control device) 500, it is preferable to perform failure recovery, that is, to specify, repair, and replace a suspicious point in a short time.

In the error process illustrated in FIG. 21, when the channel 300-1 detects an ICC, the trace log in the channel 300-1 is collected as an error log for error analysis. However, since the switch device 500 has no function of recognizing the fact that the channel 300-1 has detected an ICC, even when the channel 300-1 detects an ICC, it is difficult to recognize whether the trace log in the switch device 500 is necessary.

In other words, when the switch device 500 has a function of storing the trace logs of the IO interface of the external ports 600-1 to 600-4 in a memory, the trace logs of the external ports 600-1 to 600-4 are continuously stored in the memory by another process after the connection release process is performed.

For example, there are cases in which after the error process illustrated in FIG. 21 is performed, another external port 600-2 transmits a connection request to the external port 600-3 at the IO device 400-1 side that has released a connection regardless of an operation of the channel 300-1. Then, when the connection request is received in the external port 600-3, trace content at the time of error occurrence may be overwritten and lost.

When the error process illustrated in FIG. 21 is performed and a log of the switch device 500 side, particularly, a log of the external port 600-3 connected to the IO device 400-1 are overwritten and lost as described above, only the trace log in the channel 300-1 is used as the error log of the IO interface in the ICC analysis.

However, in the past, when it is difficult to specify a suspicious point based on the trace log in the channel 300-1 and there is no reproducibility of an error, all of devices and cables of a suspicious point become replacement targets. For example, in the example illustrated in FIGS. 20 and 21, many devices and cables such as the channel 300-1, a cable between the channel 300-1 and the external port 600-1, the switch device 500, a cable between the external port 600-3 and the IO device 400-1, and the IO device 400-1 become replacement targets.

When there are many suspicious points, the number of replacement parts increases, and a part replacement time increases with the increase in the number of replacement parts, and thus the cost for a part and a working time increases. Further, it takes a long time to recover a failure.

Practically, the demands for a reduction in the cost and a failure recovery time have increased, and in order to reduce the number of replaced suspicious parts, a replacement working time and the cost, and perform the recovery in a short time, it is desirable to collect an error log useful for error analysis for specifying a suspicious point.

SUMMARY

According to an aspect of the embodiments, an input output (IO) control device that connects a plurality of devices with each other, and includes a plurality of ports to which the plurality of devices are connected and a control unit that controls the plurality of ports with each other, wherein the control unit collects a log of a collection target port designated by a log collection instruction among the plurality of ports when the log collection instruction is received from any one of the plurality of devices through a first port to which the corresponding device is connected among the plurality of ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 7A to 7C are diagrams illustrating exemplary formats of commands used in an information processing system according to the present embodiment, FIG. 7A illustrates an exemplary format of a command, FIG. 7B illustrates an exemplary setting of a log collection command, and FIG. 7C illustrates an exemplary setting of a log collection command response;

FIG. 8 is a sequence diagram for describing a detailed example of an error processing procedure in an information processing system according to the present embodiment;

DESCRIPTION OF THE PREFERRED EMBODIMENTS

Hereinafter, an exemplary embodiment will be described with reference to the accompanying drawings.

[1] Embodiment

[1-1] Overall Configuration

Figure 1:
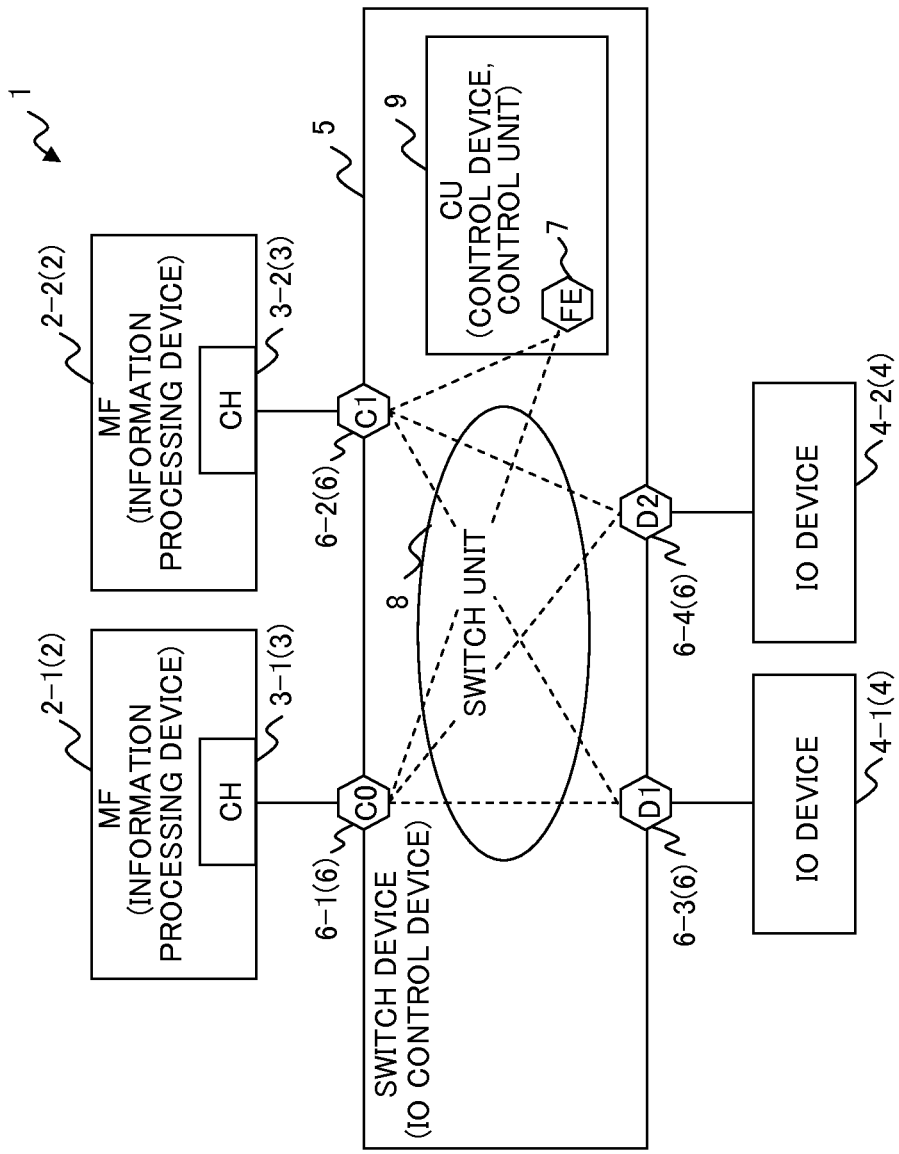
FIG. 1 is a diagram illustrating an exemplary configuration of an information processing system according to an embodiment.

FIG. 1 is a diagram illustrating an exemplary configuration of an information processing system 1 according to an embodiment.

The information processing system 1 includes information processing devices 2-1 and 2-2, IO devices 4-1 and 4-2, and a switch device 5 as illustrated in FIG. 1.

Note that, in the example illustrated in FIG. 1, for example, server devices of a backbone system such as a mainframe (MF) may be used as the information processing devices 2-1 and 2-2. Further, for example, various storage devices including a magnetic disk device such as a HDD, a semiconductor disk device such as an SSD, and a tape drive, a console, or the like may be used as the IO device 4-1 and 4-2.

The information processing devices 2-1 and 2-2 include a channel 3-1 and a channel 3-2, respectively.

Note that, in the following description, an information processing device is simply represented by a reference numeral 2 when the information processing devices 2-1 and 2-2 need not be distinguished from each other, a channel is represented by a reference numeral 3 when the channels 3-1 and 3-2 need not be distinguished from each other, and an IO device is represented by a reference numeral 4 when the IO devices 4-1 and 4-2 need not be distinguished from each other.

The channel 3 is a device that controls input and output of data, a command, or the like between the information processing device 2 and a device externally connected to the information processing device 2. The information processing device 2 can transmit or receive data, a command, or the like to or from the IO device 4 or a control device 9 (which will be described later) via the switch device 5 through the channel 3.

The channel 3 can collect and hold trace information (trace log) in its own channel 3.

Further, when the channel 3 detects an error in the state in which the channel 3 is connected with another device such as the IO device 4 via the switch device 5, the channel 3 can instruct the switch device 5 to release (separate) a connection with the IO device 4. Note that, there is an error such as an ICC as an error detected by the channel 3. In the following, the error will be described as occurring in an IO interface between the channel 3 and the IO device 4.

Hereinafter, a state in which the channel 3 is connected with another device such as the IO device 4 through the switch device 5 is referred to simply as a connection state of the channel 3 and the IO device 4.

Further, the channel 3 issues a log collection command (log collection instruction) instructing the control device 9 (which will be described later) of the switch device 5 to collect an error log of a designated port, that is, a collection target port. The command may be issued when an error of an IO interface error is detected by the channel 3 in a state in which a connection between the channel 3 and the external port 6 at the IO device side is released although the device 4 is in the connection state with the external port 6 at the IO device side. Note that, the collection target port includes at least one of the external port 6 and an internal port 7.

Further, when the switch device 5 transmits a response command including an error log in response to the log collection command transmitted by the channel 3, the channel 3 can receive and hold the error log. The error log received from the switch device 5 or the trace log of the channel 3 is used, for example, for error analysis by the channel 3, the information processing device 2, the administrator, the operator, or the like.

The switch device 5 is arranged among a plurality of devices, for example, between the channel 3 and the IO device 4, is an IO control device that connects the channel 3 with the IO device 4, and includes the external ports 6-1 to 6-4 and the internal port 7. Further, the switch device 5 includes a switch unit 8 that connects each of the external ports 6-1 to 6-4 with the internal port 7 and a control device (denoted by a CU that stands for a control unit in FIG. 1) 9.

The external ports 6-1 to 6-4 are ports that connect the channel 3 and the IO device 4 with the switch device 5, and are connected with the channels 3-1 and 3-2 and the IO devices 4-1 and 4-2. The internal port 7 is equipped in the control device 9 and connected with the external ports 6-1 to 6-4.

Note that, in the following description, when the external ports 6-1 to 6-4 need not be distinguished from each other, an external port is represented by a reference numeral 6. Further, the external port 6 and the internal port 7 are also represented by a port 6 and a port 7, respectively.

The external port 6 and the internal port 7 can collect and hold trace information of its own ports 6 and 7, respectively. When the trace information is designated to a collection target port in a log collection command from the channel 3, the trace information is collected by the control device 9.

Upon receiving a connection release instruction from the channel 3 in the connection state of the channel 3 and the IO device 4, the external port 6 releases both a connection between the external port 6 connected to the channel 3 and the channel 3 and a connection between the external port 6 connected to the IO device 4 and the IO device 4.

One external port 6 that has performed the connection release may reject reception of a connection request from a third external port 6 other than the other external port 6 that has performed the connection release during a log collection period of time by the control device 9.

As the reception of the connection request is rejected, the trace information held in the external port 6 that has performed the connection release can be prevented from being overwritten due to a connection from the third external port 6, and when the external port 6 that has performed the connection release is designated as the collection target port, log collection by the control device 9 can be reliably performed.

Note that, for example, the log collection period of time is a period of time until the control device 9 collects a log of the collection target port designated by the log collection command after the connection release is performed or a period of time until a predetermined time elapses after the connection release is performed. Here, even when the connection release process is being processed or completed, it can be said that the connection release is performed.

Each of the external ports 6-1 to 6-4 includes a monitoring timer 68 (see FIGS. 6 and 18), and can set a period of time in which the external port 6 that has performed the connection release rejects reception of the connection request from the third external port 6 through a timer 68. In other words, the external port 6 that has performed the connection release may be configured to start the timer 68 when the connection release is performed and receive the connection request from the third external port 6 when the control device 9 collects a log before a predetermined period of time elapses or when a predetermined period of time elapses.

Note that, in the drawings used in the following description, the external port (first port) 6-1 to which the channel 3-1 is connected is represented by C0, and the external port (third port) 6-2 to which the channel 3-2 is connected is represented by C1. Further, the external port (second port) 6-3 to which the IO device 4-1 is connected is represented by D1, the external port 6-4 to which the IO device 4-2 is connected is represented by D2, and the internal port 7 equipped in the control device 9 is represented by FE. In the following description, the external ports 6-1 to 6-4 are also represented by the ports C0, C1, D1, and D2, respectively, and the internal port 7 is also represented by the port FE.

The switch unit 8 is connected to each external port 6 and the internal port 7, manages the statuses of the external ports 6-1 to 6-4 and the internal port 7, and controls a connection relation between arbitrary ports. Through control of a connection relation, the switch unit 8 can establish an n-to-n connection by dynamically switching a connection among the channels 3-1 and 3-2, the IO devices 4-1 and 4-2, and the control device 9.

A detailed configuration of the switch unit 8 will be described later.

The control device 9 is connected with all of the external ports 6 through the internal port 7 and controls the ports 6 and 7. Specifically, the control device 9 performs a setting of connection permission between the external ports 6, a setting of an external port name, and configuration control such as online/offline of the external port 6, and the like.

The control of the ports 6 and 7 by the control device 9 is performed on the port 6 or 7 designated by an instruction from the information processing device 2 or the channel 3 based on the instruction. The information processing device 2 or the channel 3 gives the instruction by issuing a command to the control device 9 through the external port 6 and the switch unit 8.

Through the switch device 5, in the information processing system 1, a flexible connection can be established between the information processing device 2 and the IO device 4, and the number of channels and the number of connected channels at the time of IO connection can be reduced.

Further, when the log collection command is received from the channel 3 through the external port 6-1 connected to the channel 3, the control device 9 collects (gathers) trace information of at least one collection target port designated by the command.

Further, the control device 9 transmits the response command including the collected trace information of the collection target port to the channel 3 which is the transmission source of the log collection command.

Further, when the trace information is collected from the collection target port, the control device 9 can transmit an instruction for stopping collection of the trace information, that is, writing to the trace memory to the collection target port. Through this instruction, a collection timing of the trace information of the collection target port by the control device 9 can be prevented from overlapping a write timing of the trace information by the collection target port. Further, through this instruction, when there are a plurality of collection target ports, it is possible to prevent overwriting of the trace information by a command from another collection target port.

As described above, according to the control device 9, the channel 3 can have an opportunity to know a timing at which an IO interface error is detected. Thus, when the switch device 5 has a function of storing the trace information of the IO interface of the external port 6, an error log of a designated port number can be collected from the channel 3 to the control device 9 of the switch device 5.

Note that, in the drawings used in the following descriptions, there are cases in which the channel 3 is represented by CH, and the IO device 4 is represented by IO.

Each of the information processing devices 2-1 and 2-2 illustrated in FIG. 1 includes a single channel, but the present disclosure is not limited to this example, and each of the information processing devices 2-1 and 2-2 may include two or more channels. The information processing system 1 illustrated in FIG. 1 includes the two information processing devices 2 but may include three or more information processing devices 2. Similarly, the information processing system 1 illustrated in FIG. 1 includes the two IO devices 4 but may include three or more IO devices 4.

Next, an exemplary error processing procedure in the information processing system 1 according to the present embodiment will be described with reference to FIGS. 2 to 4.

Figure 2:
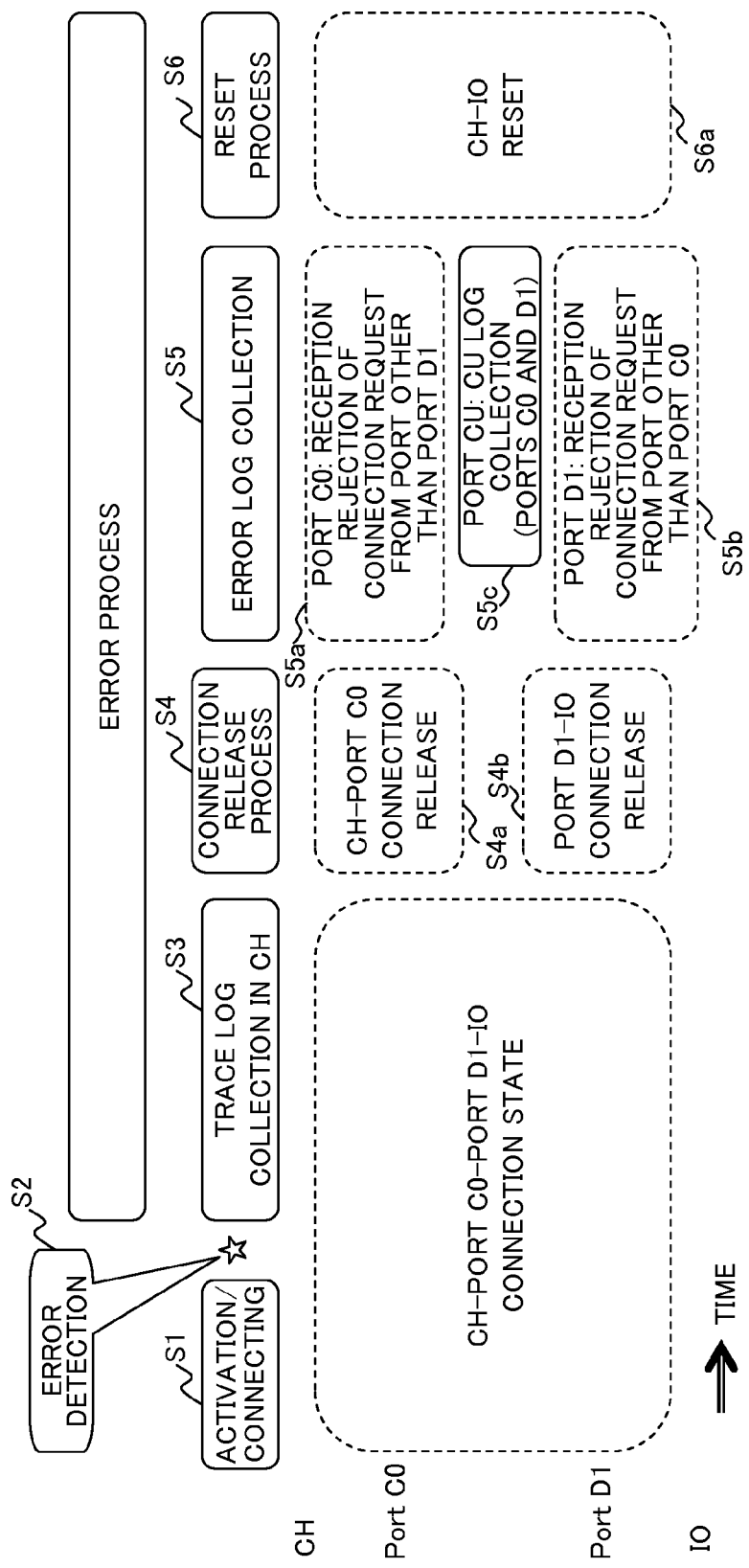
FIG. 2 is a sequence diagram for describing an exemplary error processing procedure in an information processing system according to the present embodiment.

FIG. 2 is a sequence diagram illustrating an exemplary error processing procedure in the information processing system 1 when the log collection command is issued from the channel 3, and the control device 9 collects the trace information of the collection target port. FIG. 3 is a sequence diagram illustrating an exemplary error processing procedure in the information processing system 1 when the log collection command is not issued, for example, due to a failure of the channel 3.

First, the error processing procedure illustrated in FIG. 2 will be described.

When the channel 3-1 issues the command to the IO device 4-1, the ports C0 and D1 enter the connection state (step S1).

In other words, as the command is transmitted from the channel 3-1, the channel 3-1 is connected with the IO device 4-1 through the switch device 5.

For example, when the channel 3-1 detects an error such as an ICC on interaction between the channel 3-1 and the device 4-1 in the connection state (step S2), content (trace information) of a trace in the channel 3-1 is collected (step S3).

When the trace information is collected, the channel 3-1 releases (separates) an IO interface between the channel 3-1 and the IO device 4-1 (step S4).

Specifically, the channel 3-1 transmits an instruction for releasing the connection with the channel 3-1 to the port C0. Upon receiving the instruction, the port C0 releases the connection between the channel 3-1 and the port C0 (step S4a), and transmits an instruction for releasing the connection with the IO device 4-1 to the port D1 which is in the connection state with the port C0. Upon receiving the instruction from the port C0, the port D1 releases the connection between the port D1 and the IO device 4-1 (step S4b).

When the connection between the channel 3-1 and the device 4-1 is released in step S4, the channel 3-1 can transmit a next frame to the IO device 4-1.

Thereafter, the switch device 5 collects an error log (step S5).

Specifically, the port C0 that has performed the connection release rejects reception of the connection request from the third external port 6 other than the other external port 6 that has performed the connection release, that is, the port D1 during the log collection period of time of the control device 9 (step S5a). Similarly, the port D1 that has performed the connection release rejects reception of the connection request from the third external port 6 other than the port C0 during the log collection period of time of the control device 9 (step S5b).

Note that, for example, the log collection period of time is a period of time until the control device 9 collects a log after each of the ports C0 and D1 performs the connection release or a period of time until a predetermined period of time elapses after each of the ports C0 and D1 performs the connection release. The predetermined period of time is measured by the monitoring timer 68 equipped in each of the ports C0 and D1 as described above. In the example illustrated in FIG. 2, the ports C0 and D1 determine that the log collection period of time ends when the control device 9 has collected logs, and after the log collection period of time ends, reception of the connection request from the third external port is allowed.

Further, the channel 3-1 transmits the log collection command in which the ports C0 and D1 that have performed the connection release is designated as the collection target port to the control device 9. Then, the control device 9 that has received the command collects the trace information of the ports C0 and D1 (step S5c). The trace information of the ports C0 and D1 collected by the control device 9 is included in the response command to the log collection command as an error log and transmitted to the channel 3-1 through the control device 9. Note that, the control device 9 is also represented by a port CU as illustrated in FIG. 2.

Note that, since it is difficult for the IO device 4-1 to determine that the channel 3-1 has detected an error in step S2, the IO device 4-1 recognizes that interaction with the channel 3-1 is continuously being performed. For this reason, the channel 3-1 performs a reset process of resetting the connection with the IO device 4-1 (step S6). The reset process is performed such that the channel 3-1 instructs the device 4-1 to reset, and the IO device 4-1 that is given the reset instruction resets the connection with the channel 3-1 in the IO device 4-1 (step S6a).

Next, the error processing procedure illustrated in FIG. 3 will be described.

Figure 3:
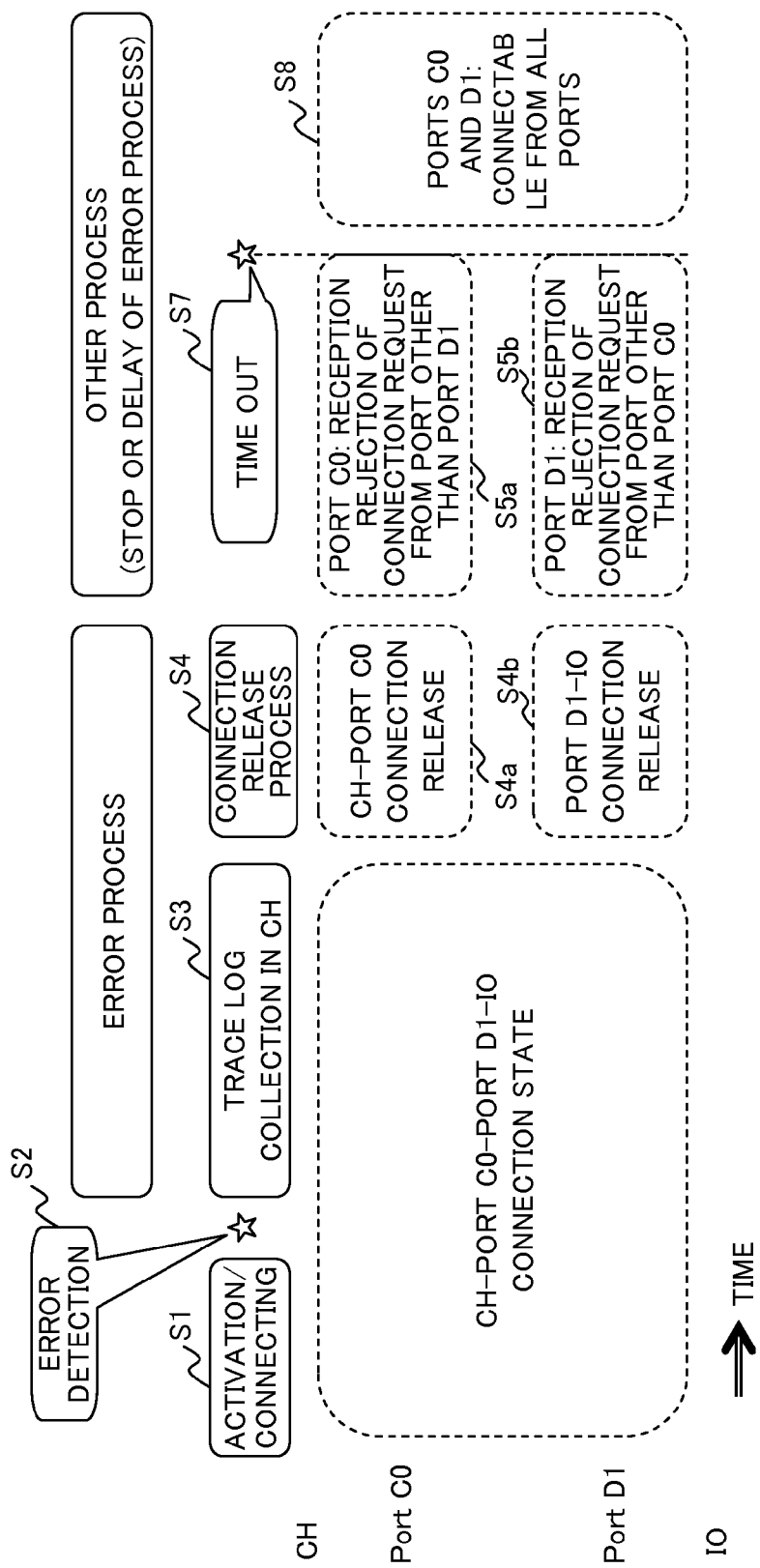
FIG. 3 is a sequence diagram for describing an exemplary error processing procedure in an information processing system according to the present embodiment.

Note that, in FIG. 3, the process of steps S1 to S4 is the same as in FIG. 2, and thus the description will not be repeated.

When the connection between the channel 3-1 and the IO device 4-1 is released in step S4, the port C0 that has performed the connection release rejects reception of the connection request from the third external port 6 other than the other external port 6 that has performed the connection release, that is, the port D1 during the log collection period of time of the control device 9 (step S5a). Similarly, the port D1 that has performed the connection release rejects reception of the connection request from the third external port 6 other than the port C0 during the log collection period of time of the control device 9 (step S5b).

Here, when the log collection command is not issued, for example, due to a failure of the channel 3, the control device 9 does not collect a log. Thus, in the example illustrated in FIG. 1, when each monitoring timer 68 detects that a predetermined period of time has elapsed, that is, when a timeout occurs (step S7), the ports C0 and D1 determine that the log collection period of time has ended, and after the log collection period of time has ended, reception of connection request from the third external port is allowed.

Then, the ports C0 and D1 can receive the connection request from all ports (step S8).

As described above, according to the control device 9 of the present embodiment, the channel 3 receives the log collection command, and thus the channel 3 can have an opportunity to know a timing at which an IO interface error is detected. Thus, when the switch device 5 has a function of storing the trace information of the IO interface of the external port 6, the control device 9 can reliably collect the error log of the switch device 5 when an error is detected based on the log collection command transmitted from the channel 3.

In other words, when there occurs an error that causes a release (separation) of an IO interface in the information processing system 1 in which the channel 3 is connected with the IO device 4 through the switch device 5, an error log of the switch device 5 useful for error analysis can be collected.

Further, when an error is detected by the channel 3, it is possible to collect not only trace information in the channel 3 that has detected an error but also trace information of the external port 6 of the switch device 5 as an error log of the IO interface for error analysis. Thus, it is possible to collect an error log useful for error analysis, and it is easy to analyze a location at which an error has occurred among the channel 3, a cable between the channel 3 and the external port 6, the switch device 5, a cable between the external port 6 and the IO device 4, and the IO device 4. Thus, it is possible to reduce the number of prepared failure replacement parts and a failure recovery time.

Further, for example, a specific port such as the ports C0 and D1 may be designated as the collection target port included in the log collection command. Thus, even when a plurality of ports 6 are equipped in the switch device 5, since the control device 9 has only to collect the trace log only on the collection target port, it is possible to suppress an increase in a processing load of the control device 9 related to log collection and an increase in a memory capacity for storing collected logs.

Further, according to the present embodiment, in the external port 6 that has performed the connection release, the control device 9 may reject reception of the connection request from the third external port 6 during the log collection period of time. Since the reception of the connection request is rejected, the trace information held in the external port 6 that has performed the connection release can be prevented from being overwritten due to a connection from the third external port 6. Thus, when the external port 6 that has performed the connection release is designated as the collection target port by the log collection command issued by the channel 3, the control device 9 can reliably perform log collection.

[1-2] Configuration of Switch Unit

Next, an exemplary configuration of the switch unit 8 according to the present embodiment will be described with reference to FIGS. 4 to 6.

Figure 4:
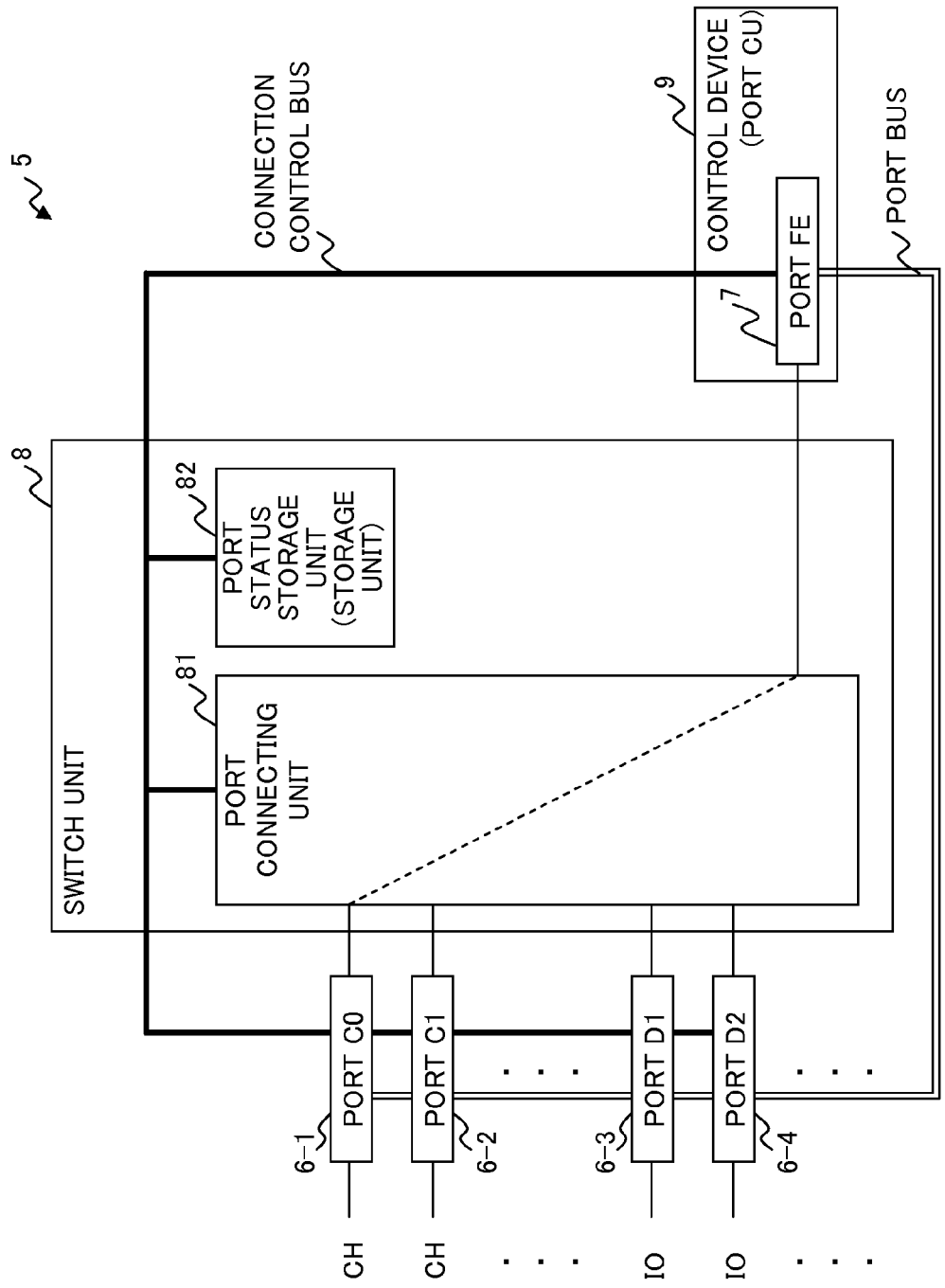
FIG. 4 is a diagram illustrating an exemplary configuration of a switch device according to the present embodiment.
Figure 5:
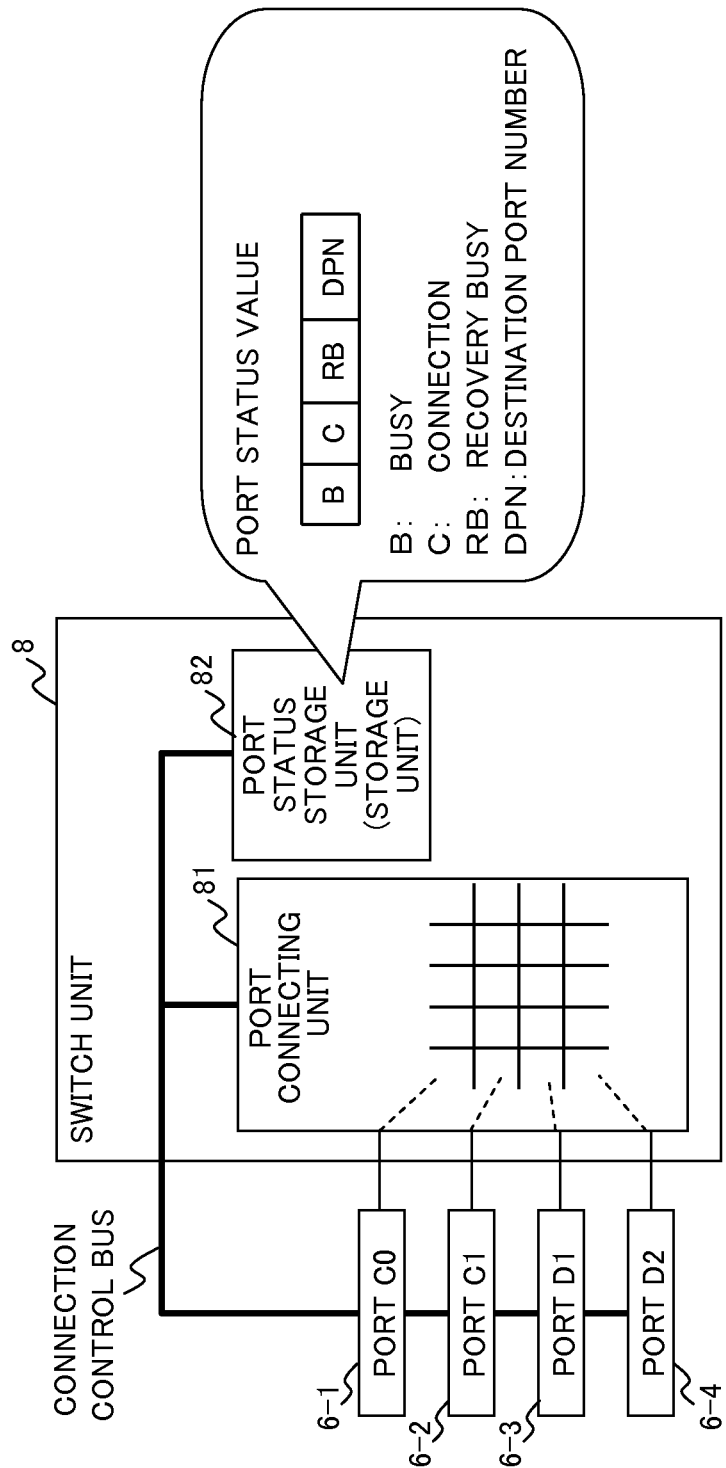
FIG. 5 is a diagram illustrating an exemplary port status value in a switch unit according to the present embodiment.

FIG. 4 is a diagram illustrating an exemplary configuration of the switch device 5 according to the present embodiment, and FIG. 5 is a diagram illustrating an exemplary port status value in the switch unit 8 according to the present embodiment. FIG. 6 is a diagram for describing an exemplary error processing procedure in the information processing system 1 according to the present embodiment.

The switch unit 8 includes a port connecting unit 81 and a port status storage unit (storage unit) 82 as illustrated in FIG. 4.

The port connecting unit 81 is a switch connected to each of the external ports 6-1 to 6-4 and the internal port 7, and connects the ports 6 and 7 with each other.

The port status storage unit 82 is a memory or a register that holds a status of each port, and is configured with a volatile memory such as a random access memory (RAM) for example.

Specifically, the port status storage unit 82 holds a port status value illustrated in FIG. 5 in units of ports.

For each of the ports 6 and 7, "B (Busy)" representing whether a corresponding port is busy, "C (Connection; connection state)" representing whether a corresponding port is in the connection state with a port of a connection counterpart, "RB (Recovery Busy)" representing whether a connection of a corresponding port has been released due to an error and the error process is in progress, and "DPN (Destination Port Number; port number)" representing a counterpart port number (address) of a counterpart port with which a corresponding port is in the connection state or connected are included as the port status value as illustrated in FIG. 5.

For example, in the port status value, an on or off state corresponding to a status of a current port is set to each of "B," "C," and "RB" in association with each of the ports 6 and 7, and a number of a counterpart port is set to "DPN." In the following, an example in which "B," "C," and "RB" of the port status value are set by a bit of "1" representing "on" and a bit of "0" representing "off" will be described as an example of a setting of the port status value.

The switch unit 8 connects the ports 6 and 7 with each other through the port connecting unit 81 based on the port status value held in the port status storage unit 82.

Here, both "B" and "RB" of the port status value are information representing a busy status, and the connection request from another port 6, that is, the port 6 other than a port having a number designated to "DPN" to the port 6 in which a bit of "B" or "RB" is "1" is rejected by the switch unit 8.

Further, each of the ports 6 and 7 performs status control of setting (changing) its own port status value according to a request or an instruction from the channel 3 of a connection counterpart, the IO device 4, or another port 6 or 7.

Figure 6:
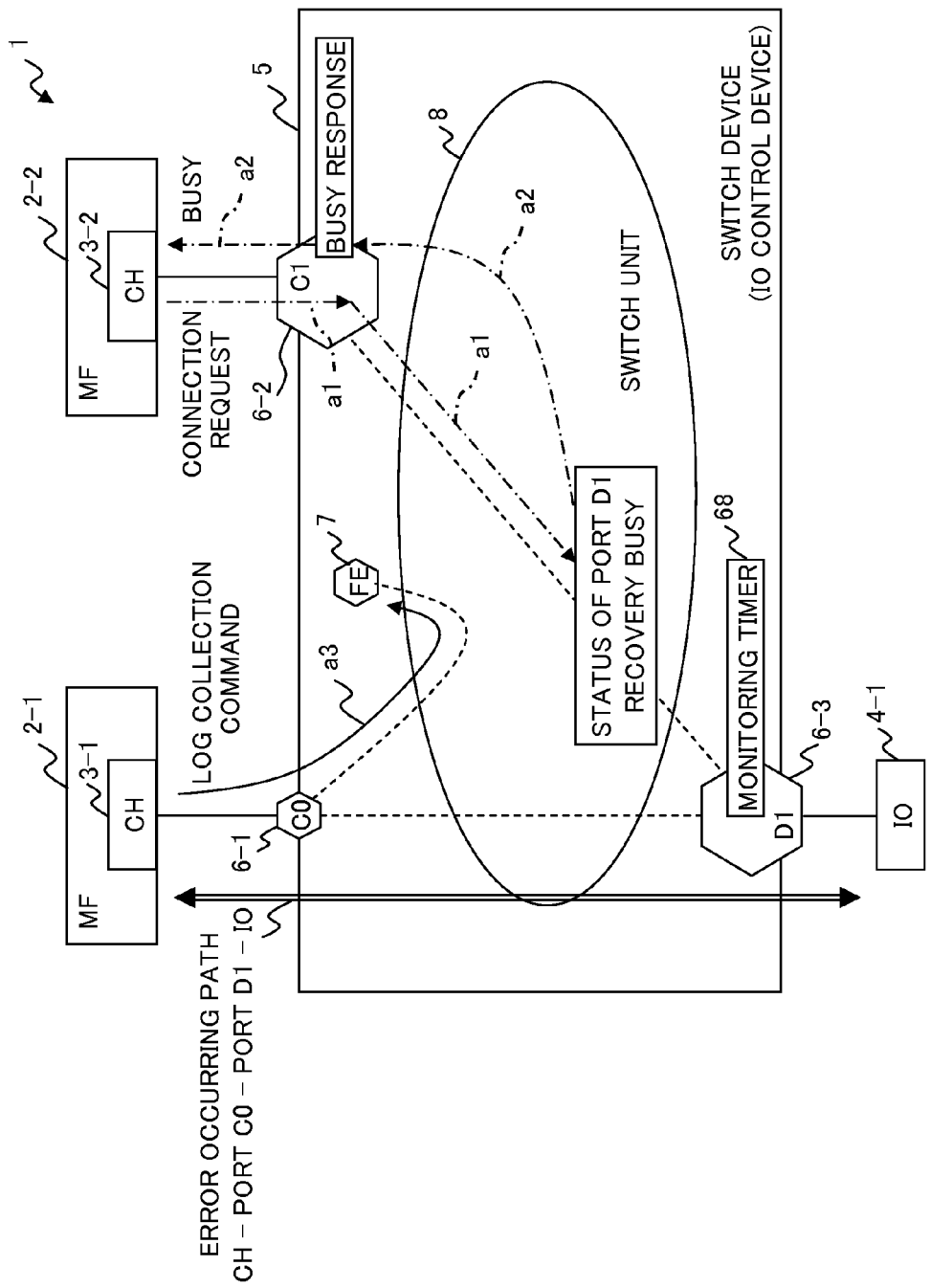
FIG. 6 is a diagram for describing an exemplary error processing procedure in an information processing system according to the present embodiment.

For example, as illustrated in FIG. 6, the port D1 (the collection target port) in the error occurring path sets "1" to a bit of "RB" of the port status value as a status corresponding to its own port. Thus, the status value of the port D1 is recovery busy, and the log collection period of time of the control device 9 starts.

For example, when the connection request is transmitted from the port C1 which is a port other than the collection target port to the collection target port D1 (see an arrow a1 in FIG. 6), the switch unit 8 refers to a status corresponding to the collection target port D1 held in the port status storage unit 82. Then, when the bit of "RB" in the status is "1," the switch unit 8 transmits a busy response to the port C1 (see an arrow a2 in FIG. 6).

Note that, the channel 3-1 transmits the log collection command to the port FE, that is, the control device 9 within the log collection period of time (see an arrow a3 in FIG. 6).

Further, the collection target port D1 clears "RB" set as the status corresponding to its own port, that is, sets "0" to the bit of "RB" and ends the log collection period of time. In other words, the collection target port D1 clears "RB" set as the status of its own port when the log collection period of time ends as the control device 9 completes log collection of the port D1 or as measurement by the monitoring timer 68 times out. As described above, for example, reception of the connection request from the port C1 connected to the channel 3-2 to the port D1 is rejected by the log collection period of time.

Note that, examples of the port connecting unit 81 include a multiplexer, a cross-point switch, and a crossbar switch. Further, in the present embodiment, the port status storage unit 82 is equipped separately from the port connecting unit 81, but the present disclosure is not limited to this example, and the port status storage unit 82 may be equipped in the port connecting unit 81.

The switch device 5 connects the external port 6, the internal port 7, and the switch unit 8 with each other through a connection control bus and a port bus as illustrated in FIGS. 4 and 5.

The connection control bus is a bus through which the external port 6 and the internal port 7 transfer a command related to a connection to the switch unit 8.

The port bus is a bus through which control information is transferred from the control device 9 to the external port 6, and the port status such as the trace information is transferred from the external port 6 to the control device 9.

Note that, in the example illustrated in FIGS. 4 and 5, for simplicity of the drawings, the ports 6 and 7 are connected with each other in a cascade form via the connection control bus and the port bus. However, practically, a plurality of connection control buses are provided, and the plurality of connection control buses connect the internal port 7 with each of the external port 6, the port connecting unit 81, and the port status storage unit 82 in a one-to-one manner. Further, the plurality of connection control buses connect each external port 6 with the port connecting unit 81 and the port status storage unit 82 in a one-to-one manner.

Similarly, practically, a plurality of port buses are provided, and the plurality of port buses connect the internal port 7 with each external port 6 in a one-to-one manner.

[1-3] Explanation of Command

Next, an exemplary format of a command used in the information processing system 1 according to the present embodiment will be described.

FIGS. 7A to 7C are diagrams illustrating exemplary formats of commands used in the information processing system 1 according to the present embodiment. FIG. 7A illustrates an exemplary format of a command, FIG. 7B illustrates an exemplary setting of the log collection command, and FIG. 7C illustrates an exemplary setting of the log collection command response. FIG. 8 is a sequence diagram for describing a detailed example of the error processing procedure in the information processing system 1 according to the present embodiment.

A command used in the information processing system 1 according to the present embodiment is generated according to the format illustrated in FIG. 7A.

Here, in FIG. 7A, a predetermined value representing the start of a frame is set to SOF (Start of Frame), a port number representing a destination of a command is set to DA (Destination Address), and a port number representing a transmission source of a command is set to SA (Source Address).

A type of command is set to LCTL (Link Control). For example, when a command is the log collection command illustrated in FIG. 7B, a predetermined log collection instruction code is set to the LCTL. Further, for example, when a command is the response command to the log collection command illustrated in FIG. 7C, a predetermined log collection response code representing a log collection response is set to the LCTL.

Data in which notification is given to the destination of a command is set to DATA (Data). For example, when a command is the log collection command illustrated in FIG. 7B, a trace collection port (collection target port) number is set to DATA, and when a command is the log collection command response illustrated in FIG. 7C, trace data of each collection target port is set to DATA as an error log.

CRC (Cyclic Redundancy Checksum) is an error detecting code and is set to detect a bit error in a frame. Note that, instead of a CRC, any other bit error detecting technique may be used. A predetermined value representing the end of a frame is set to EOF (End of Frame).

Next, commands of FIGS. 7A to 7C used in the information processing system 1 and a sequence will be described with reference to FIG. 8.

Note that, in FIG. 8, the process of steps S1 to S6 is the same as in FIG. 2, and a detailed description will not be repeated.

When the channel 3-1 starts data transfer, the command frame illustrated in FIG. 7A is transmitted to the target IO device 4-1 as a start command. In the start command, a number of the port C0 to which the channel 3-1 is connected is set to SA, and a number of the counterpart port D1 to which the IO device 4-1 is connected is set to DA.

Further, for example, as many "0s" as predetermined bits are set to LCTL as a code of an invalid instruction since an instruction to the destination port D1 is unnecessary, and an instruction to be given to the IO device 4-1, for example, a read/write instruction or/and a command including data or the like is set to DATA.

In the port C0 that has received the start command frame, it is checked that the counterpart port D1 designated by the command frame is a connectable status, and a connection between the ports C0 and D1 is established. Then, the command frame is transferred to the IO device 4-1 through the port D1 (step S1a). The channel 3-1 is in the state in which the port C0 at the channel side and the port D1 at the IO side are connected with each other while a program establishing a connection with the IO device 4-1 is being executed (step S1).

When the channel 3-1 detects an error without recognizing the response command transmitted from the IO device 4-1 to the channel 3-1 (steps S1b and S2), the channel 3-1 starts the error process. First, the channel 3-1 collects trace information of its own 10 interface (step S3).

A process of releasing a connection between the channel 3-1 and the IO device 4 is performed (step S4). In step S4, the channel 3-1 transmits an unconditional disconnect (UD) sequence to the port C0. Upon receiving the UD sequence, the port C0 makes an attempt to release the connection between the channel 3-1 and the port C0.

Specifically, an unconditional disconnect response (UDR) sequence is transmitted from the port C0. When the UDR sequence is received in the channel 3-1 and the channel 3-1 and the port C0 enter an IDLE status, the connection between the channel 3-1 and the port C0 is released (step S4a).

Further, when the port C0 receives the UD sequence, the UD sequence is transmitted from the port D1 to the IO device 4-1. Upon receiving the UD sequence, the IO device 4-1 transmits the UDR sequence. When the UDR sequence is received in the port D1, and the port D1 and the IO device 4-1 transmit an IDLE sequence to each other, the connection between the port D1 and the IO device 4-1 is released (step S4b). Then, the channel 3-1 can transmit a next frame to the IO device 4-1.

Note that, the UD sequence, the UDR sequence, and the IDLE sequence are notices of a connection release request, a response thereto, and an idle status, and are signals of a layer lower than the command illustrated in FIG. 7A.

In steps S5a and S5b, when the ports C0 and D1 enter the recovery busy status and the log collection period of time starts, the channel 3-1 transmits the log collection command illustrated in FIG. 7B to the control device 9. Then, the control device 9 collects the trace information of the ports C0 and D1 designated by the log collection command (step S5c), and the collected error log is stored in DATA of the log collection command response (the response command) illustrated in FIG. 7C and transmitted to the channel 3-1.

Further, when the control device 9 collects the trace information of the ports C0 and D1, the recovery busy statuses of the ports C0 and D1 are released, the log collection period of time ends, and the ports C0 and D1 become connectable from all ports (step S5d).

Lastly, the reset process is performed between the channel 3-1 and the IO device 4-1 (step S6). Specifically, the channel 3-1 transmits a reset command having the format illustrated in FIG. 7A to the IO device 4-1 (step S6a), and when the response (reset response) is received (step S6b), the device 4-1 performs the reset process and completes the error process.

[1-4] Error Processing Procedure

Next, an exemplary error processing procedure in the information processing system 1 according to the present embodiment will be described in detail with reference to FIGS. 9 to 13.

Figure 9:
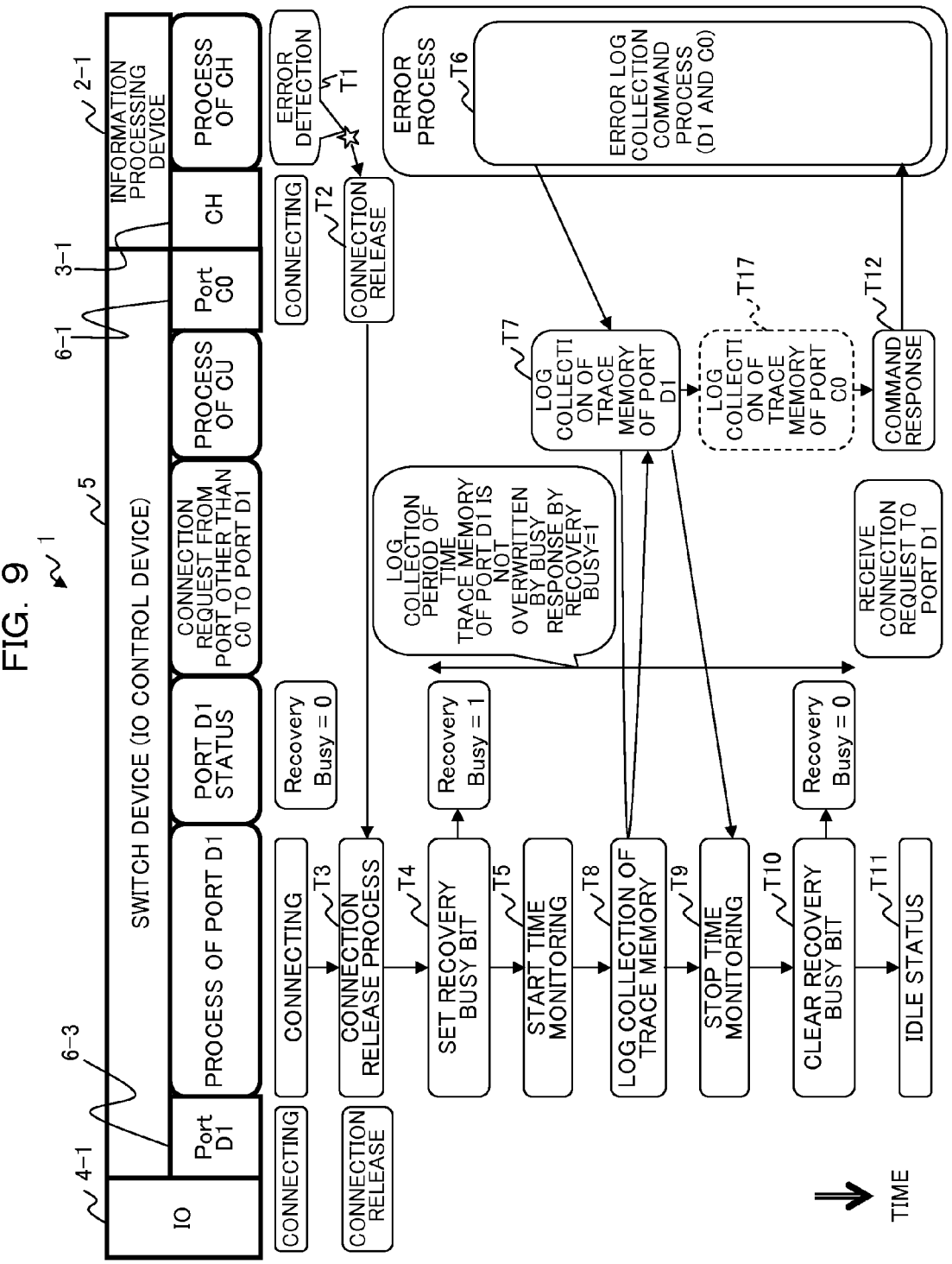
FIG. 9 is a sequence diagram for describing an exemplary error processing procedures in an information processing system according to the present embodiment focusing on a process of a port D1.
Figure 10:
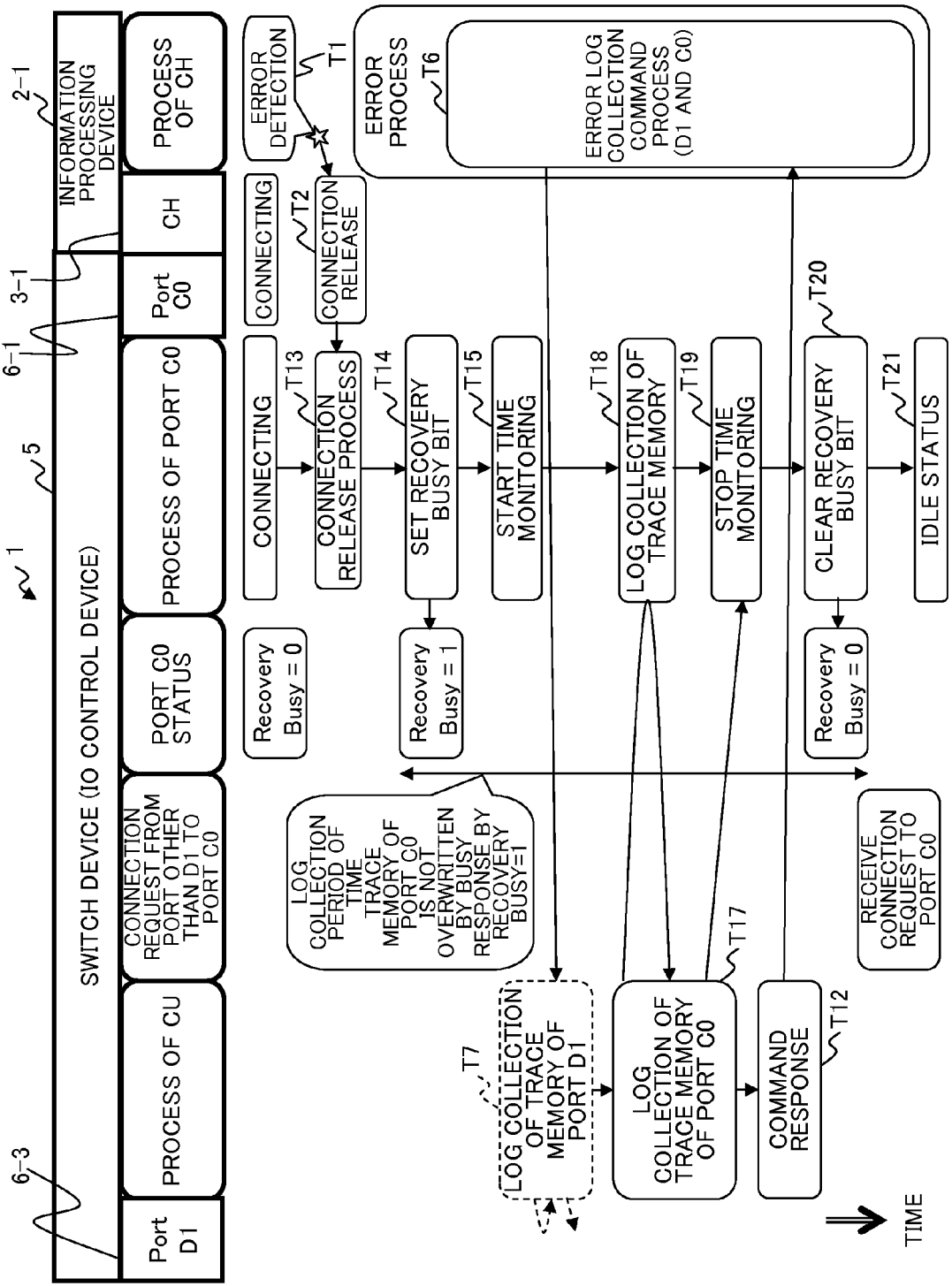
FIG. 10 is a sequence diagram for describing an exemplary error processing procedures in an information processing system according to the present embodiment focusing on a process of a port C0.

FIGS. 9 and 10 are sequence diagrams illustrating exemplary detailed error processing procedures in the information processing system 1 when the channel 3 issues the log collection command, and the control device 9 collects the trace information of the collection target port.

Figure 11:
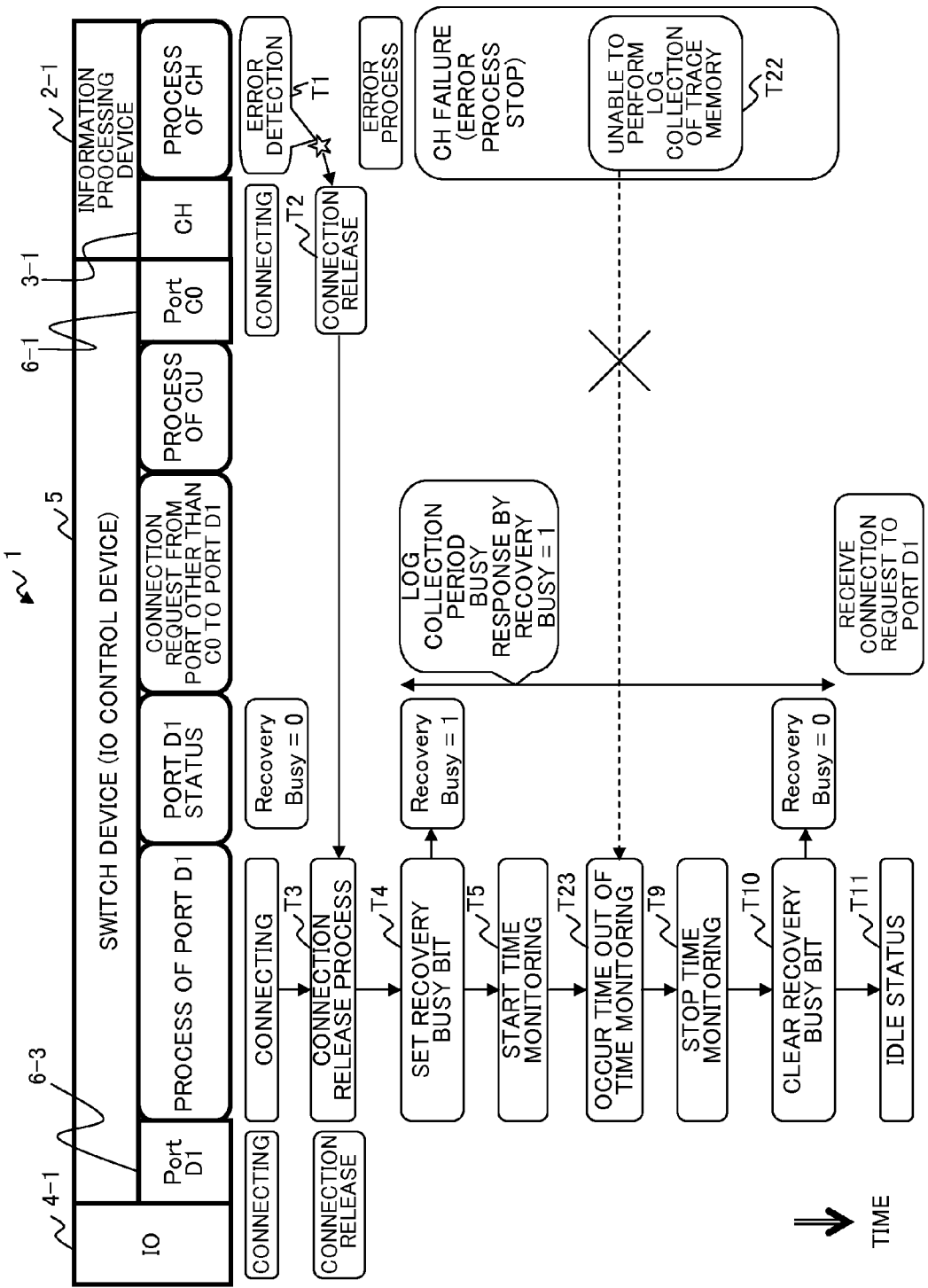
FIG. 11 is a sequence diagram for describing an exemplary error processing procedures in an information processing system according to the present embodiment focusing on a process of the port D1.
Figure 12:
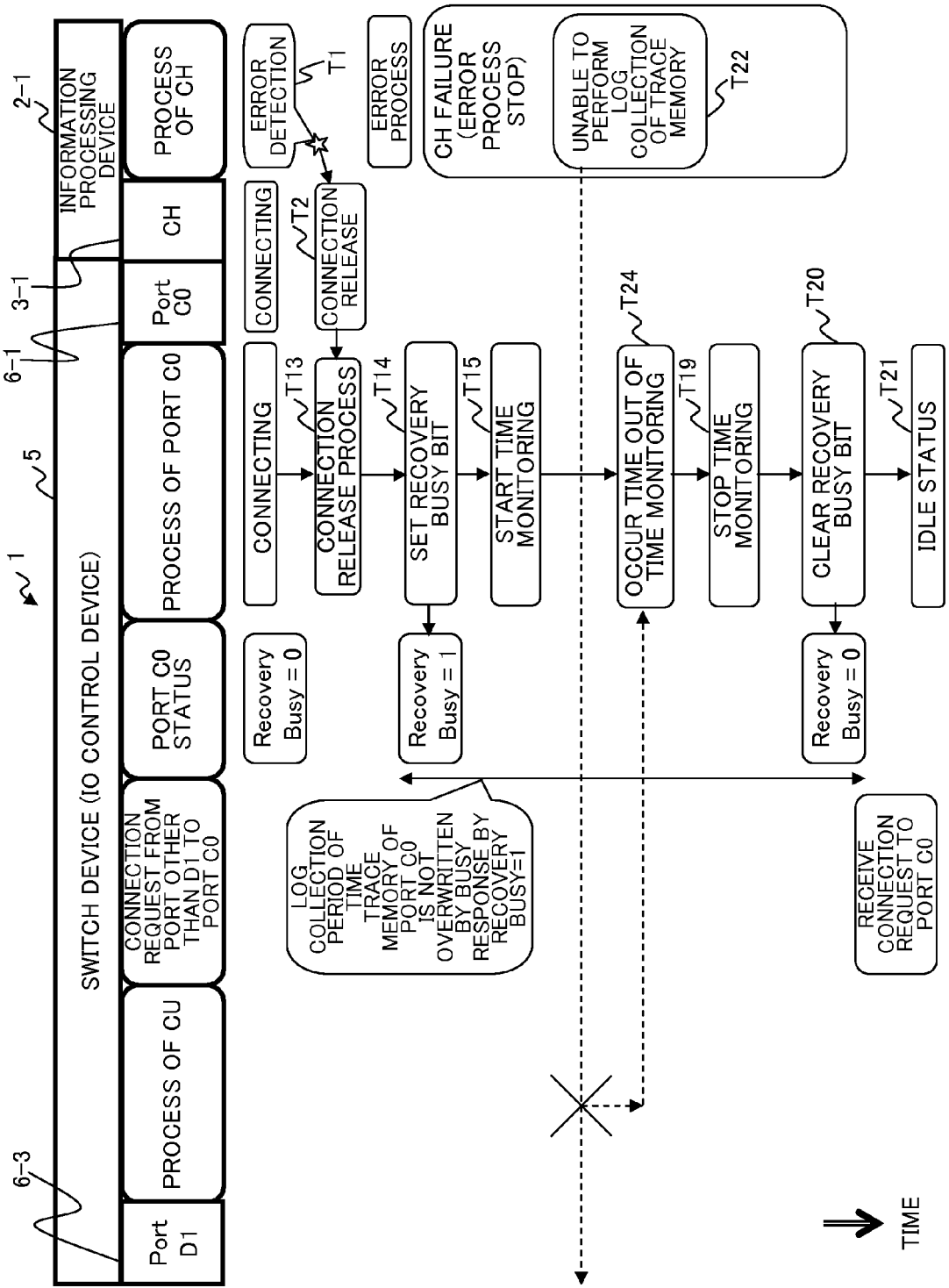
FIG. 12 is a sequence diagram for describing an exemplary error processing procedures in an information processing system according to the present embodiment focusing on a process of the port C0.

FIGS. 11 and 12 are sequence diagrams illustrating exemplary error processing procedures in the information processing system 1 when the log collection command is not issued, for example, due to a failure of the channel 3.

Note that, FIGS. 9 and 11 will be described focusing on the process of the port D1, and FIGS. 10 and 12 will be described focusing on the process of the port C0.

Figure 13:
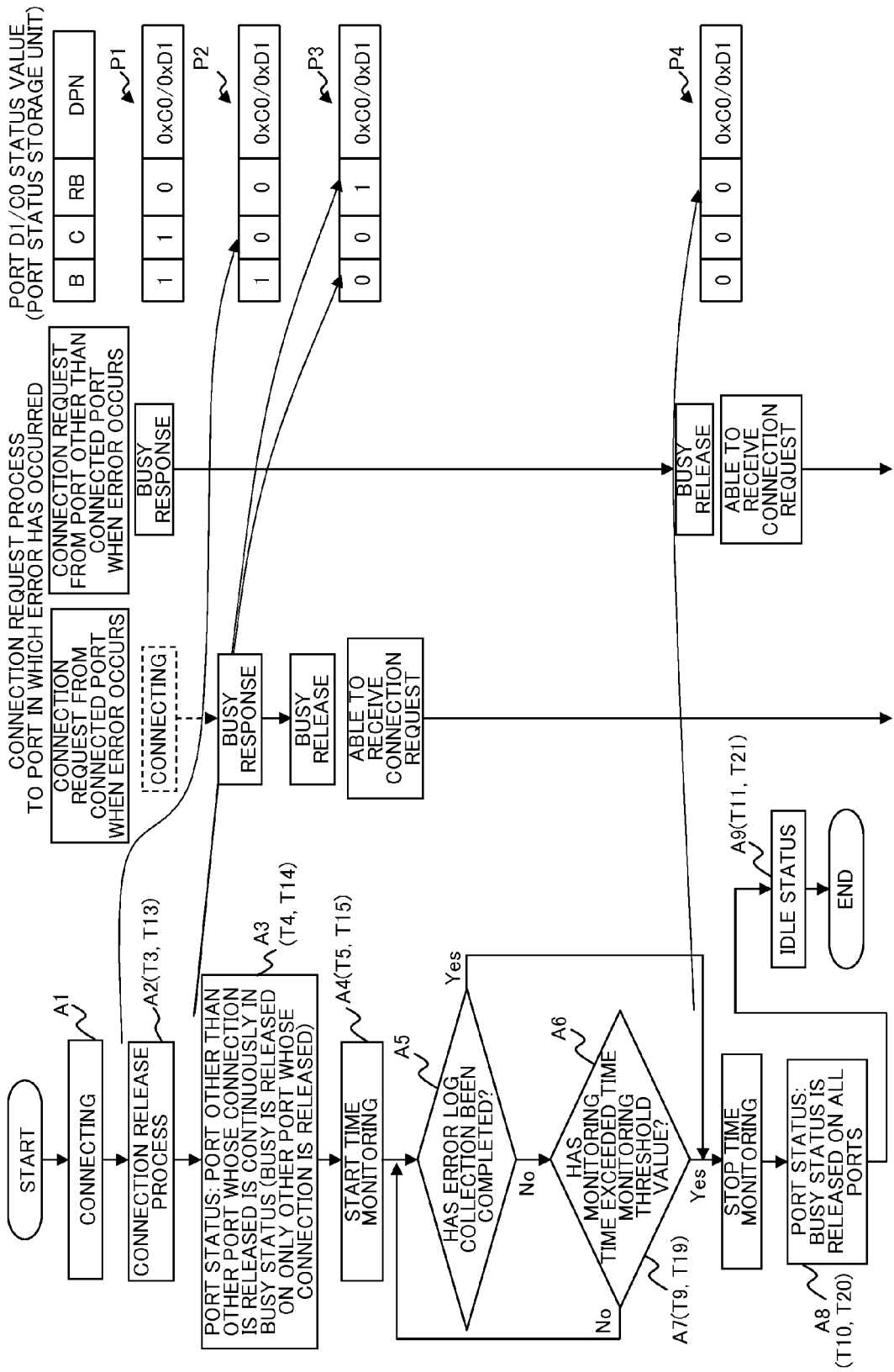
FIG. 13 is a flowchart for describing a change in a port status value in an error processing procedure according to the present embodiment.

FIG. 13 is a flowchart for describing a change in the port status value in the error processing procedure according to the present embodiment.

As illustrated in FIG. 9, when the channel 3-1 detects an error in the state in which the channel 3-1, the port C0, the port D1, and the IO device 4-1 are connected with one another (step T1), a connection between the channel 3-1 and the port C0 is released (step T2).

Further, when the connection between the port D1 and the IO device 4-1 is released (step T3), in the port status storage unit 82, "1" is set to the recovery busy bit ("RB") of the corresponding port status value for the port D1 (step T4). Note that, the setting of the recovery busy bit may be performed during the connection release process of the port D1 and the IO device 4-1.

Then, the port D1 activates the monitoring timer 68 equipped in the port D1 and starts time monitoring (step T5).

As "1" is set to the recovery busy bit of the port D1 in step T4, the switch unit 8 transmits the busy response to the connection request command from the third port other than the port C0 to the port D1. As a result, the trace information of the port D1 can be prevented from being overwritten due to a connection from the third port.

Meanwhile, when the connection between the channel 3-1 and the IO device 4-1 is released, the channel 3-1 starts the error process. In the error process, the channel 3-1 transmits the log collection command in which the ports D1 and C0 are designated as the log collection target port to the control device 9 (step T6).

Upon receiving the log collection command, the control device 9 collects the trace information of the port D1 which is the collection target port (steps T7 and T8), and the time monitoring of the monitoring timer 68 of the port D1 is stopped (step T9).

When the time monitoring of the monitoring timer 68 is stopped, in the port status storage unit 82, "0" is set to the recovery busy bit ("RB") of the corresponding port status value for the port D1, and so the recovery busy bit is cleared (step T10). As a result, in the switch unit 8, reception of the connection request command from the third port other than the port C0 to the port D1 is allowed, and the port D1 enters the idle state (step T11).

Note that, when the collection of the trace information of the port D1 is completed in step T7, the control device 9 collects the trace information of the port C0 which is the collection target port (step T17; see FIG. 10). Further, the control device 9 sets the collected trace information of the ports D1 and C0 to DATA of the response (the response command) to the log collection command as the error log, and transmits the response command to the channel 3-1 (step T12).

Meanwhile, in the process performed at the port C0 side which is the log collection target port, when the channel 3-1 detects an error (step T1), the process of releasing the connection between the channel 3-1 and the port C0 is performed as illustrated in FIG. 10 (steps T2 and T13).

Further, in the port status storage unit 82, "1" is set to the recovery busy bit ("RB") of the corresponding port status value for the port C0 (step T14). Note that, the setting of the recovery busy bit may be performed during the connection release process of the channel 3-1 and the port C0.

Then, the monitoring timer 68 equipped in the port C0 is activated, and starts time monitoring (step T15).

As "1" is set to the recovery busy bit of the port C0 in step T14, the switch unit 8 transmits the busy response to the connection request command from the third port other than the port D1 to the port C0. As a result, the trace information of the port C0 can be prevented from being overwritten due to a connection from the third port.

Similarly to FIG. 9, when the channel 3-1 transmits the log collection command in step T6, the control device 9 collects the trace information of the port D1 which is the collection target port (step T7; see FIG. 9).

Then, the control device 9 collects the trace information of the port C0 (steps T17 and T18), and stops the time monitoring of the monitoring timer 68 of the port C0 (step T19).

The recovery busy bit is cleared for the port C0, similarly to step T10 of FIG. 9 (step T20). As a result, in the switch unit 8, reception of the connection request command from the third port other than the port D1 to the port C0 is allowed, and the port C0 enters the idle state (step T21).

Note that, when the collection of the trace information of the port C0 in step T17 is completed, the control device 9 sets the trace information of the ports D1 and C0 to the response command, and transmits the response command to the channel 3-1 (step T12).

Next, the error processing procedure in the information processing system 1 when the log collection command is not issued, for example, due to a failure of the channel 3 will be described with reference to FIGS. 11 and 12.

Note that, the process of steps T1 to T5 in FIG. 11 and the process of steps T1, T2, and T13 to T15 in FIG. 12 are the same as the processes illustrated in FIGS. 9 and 10, respectively, and a description thereof will not be repeated.

As illustrated in FIG. 11, in step T4, the port D1 enters the recovery busy status, and when the log collection command is not issued by the channel 3-1 (step T22) in the state in which time monitoring by the monitoring timer 68 of the port D1 starts in step T5, a monitoring timeout occurs in the monitoring timer 68 of the port D1 (step T23).

In the port D1, the time monitoring of the monitoring timer 68 is stopped by the timeout (step T9), the recovery busy bit of the port D1 is cleared (step T10), reception of the connection request command from the third port other than the port C0 to the port D1 is allowed, and the port D1 enters the idle state (step T11).

Note that, the log collection command is not issued, for example, when it is difficult for the channel 3 to perform error log collection due to a failure or the like, when the channel 3 determines that error log collection is unnecessary, or when the channel 3 does not support the error log collection command.

Similarly, in the port C0, as illustrated in FIG. 12, in step T14, the port C0 enters the recovery busy status, and when the channel 3-1 does not issue the log collection command (step T22) in the state in which the time monitoring by the monitoring timer 68 of the port C0 starts in step T15, a monitoring timeout occurs in the monitoring timer 68 of the port C0 (step T24).

In the port C0, the time monitoring of the monitoring timer 68 is stopped by the timeout (step T19), the recovery busy bit of the port C0 is cleared (step T20), reception of the connection request command from the third port other than the port D1 to the port C0 is allowed, and the port C0 enters the idle state (step T21).

Note that, the processes illustrated in FIGS. 9 to 12 have been described in connection with the example in which the ports C0 and D1 are designated to the log collection command transmitted from the channel 3-1 to the control device 9 as the collection target port, but the present disclosure is not limited to this example.

For example, any one of the ports C0 and D1 may be designated to the log collection command as the collection target port. When the port D1 is designated as the collection target port, the control device 9 does not perform the process of step T17 in FIG. 9 and the process illustrated in FIG. 10. Further, when the port C0 is designated as the collection target port, the control device 9 does not perform the process of step T7 in FIG. 10 and the process illustrated in FIG. 9.

Further, the processes illustrated in FIGS. 9 to 12 have been described in connection with the example in which when the ports C0 and D1 are designated as the collection target port, the control device 9 first collects the trace information of the port D1 and then collects the trace information of the port C0. This is because since the trace information of the channel 3-1 is collected before the error process is performed by the channel 3-1 (see step S3 in FIGS. 2, 3, and 8), the trace information of a port distant from the channel 3-1, that is, the trace information of the port D1 at the IO device 4-1 side is preferentially collected.

In other words, information in common with the trace information of the channel 3-1 is likely to be included in the trace information of the port C0 at the channel 3-1 side. Thus, in the processes illustrated in FIGS. 9 to 12, the control device 9 preferentially collects a log from the port 6 at the side distant from the channel 3 which is the transmission source of the log collection command, that is, at the communication counterpart side of the channel 3 when a plurality of ports 6 are designated as the collection target port.

Note that, the connection release process (see step S4*b* of FIG. 8) of the port D1 and the IO device 4-1 may not be completed before the channel 3-1 issues the log collection command, for example, due to a delay of the UDR sequence from the IO device 4-1.

Thus, the control device 9 may preferentially collect a log from a port at the side that is likely to first complete the connection release process and close to the channel 3 which is the transmission source of the log collection command, that is, from the port 6 connected to the channel 3. In other words, in the processes illustrated in FIGS. 9 to 12, the sequence of the process of steps T7 and T17 may be changed.

In this regard, when there are a plurality of collection target ports, it is desirable to decide a degree of importance of trace information, that is, a collection priority of trace information by the control device 9 in advance for each collection target port. Thus, the sequence in which the control device 9 performs the log collection process can be decided based on the priority of each collection target port, and trace information of an important port can be preferentially acquired with a high degree of accuracy.

Note that, when there are a plurality of collection target ports as described above, there occurs a time difference in a timing at which the control device 9 performs the log collection process. In this regard, for example, a predetermined period of time in which the monitoring timer 68 times out may be set such that a period of time of the collection target port in which the log collection process is later performed is longer than a period of time of the collection target port in which the log collection process is first performed.

Next, the error processing procedure of the present embodiment will be described with reference to FIG. 13 in connection with a change in the port status value. Note that, in FIG. 13, status control on the port C0 at the channel 3-1 side or the port D1 at the IO device 4-1 side when the channel 3-1 detects an error is represented by a flowchart at the left side. Further, in FIG. 13, a change in the status of the port D1 or C0 that has performed the connection release is illustrated at the center, and a change in the port status value of the port D1 or C0 that has performed the connection release is illustrated at the right side.

In the example illustrated in FIG. 13, similarly to the information processing system 1 illustrated in FIG. 6, the channel 3-1 is connected with the IO device 4-1 through the ports C0 and D1 (step A1).

In the connection state, in the port status values of the ports D1 and C0, "1" is set to "B" and "C," and "0" is set to "RB." Further, "0xC0" is set to "DPN" in the port status value of the port D1 as a number of the port C0 of the connection counterpart, and "0xD1" is set to "DPN" in the port status value of the port C0 as a number of the port D1 of the connection counterpart (see P1).

Further, in the connection state, in the connection request from a port other than the port 6 connected with the ports D1 and C0, a bit of "B" in the port status value is set to ON, and thus the switch unit 8 transmits the busy response.

Then, when the channel 3-1 detects an error, communication between the channel 3-1 and the IO device 4-1 is suspended. At this time, the ports C0 and D1 set "0" to "C" in the port status values of the ports C0 and D1 (see P2).

In the connection release process (step A2, step T3 of FIG. 9, and step T13 of FIG. 10) performed by the ports C0 and D1, "0" and "1" are set to "B" and "RB" in the port status values of the ports C0 and D1, respectively (see P3), and the ports C0 and D1 enter the recovery busy status. In other words, when the port status values of the ports D1 and C0 are changed to the values represented by P3, the ports C0 and D1 that have performed the connection release continuously maintain the busy status on a port other than the counterpart port D1 or C0 that has performed the connection release. Meanwhile, the busy status is released only on the counterpart port C0 or D1 that has performed the connection release, and reception of the connection request is allowed (step A3, step T4 of FIG. 9, and step T14 of FIG. 10).

The monitoring timer 68 equipped in each of the ports C0 and D1 starts time monitoring (step A4, step T5 of FIG. 9, and step T15 of FIG. 10). During the time monitoring, each of the ports C0 and D1 determines whether the trace information of each of the ports C0 and D1 by the control device 9 has been collected as an error log (step A5). This determination is performed depending on whether an instruction (notification) from the control device 9, for example, an error log collection completion instruction (completion notification) has been received.

When it is determined that the instruction from the control device 9 has been received and the error log collection has been completed (a Yes route in step A5), in the port C0 or D1 that has received the instruction, the time monitoring by the monitoring timer 68 is stopped (step A7, step T9 of FIG. 9, and step T19 of FIG. 10).

Meanwhile, when it is determined that the error log collection has not been completed (a No route in step A5), the port C0 or D1 determines whether a monitoring time of the monitoring timer 68 has exceeded a time monitoring threshold value, that is, whether a timeout has occurred (step A6). When it is determined that the monitoring time has not exceeded the time monitoring threshold value (a No route in step A6), the process returns to step A5. However, when it is determined that the monitoring time has exceeded the time monitoring threshold value (a Yes route in step A6), the process proceeds to step A7.

When the time monitoring is stopped in step A7, "0" is set to "RB" in the port status value of the port C0 or D1 that has stopped the time monitoring (see P4), the recovery busy status of the port C0 or D1 is released. In other words, the port C0 or D1 of which the recovery busy status is released releases the busy status on a port other than the counterpart port D1 or C0, receives the connection request from all ports, and enters the idle state (steps A8 and A9, steps T10 and T11 of FIG. 9, and steps T20 and T21 of FIG. 10).

Next, processes of the channel 3 and the control device 9 in the information processing system 1 according to the present embodiment will be described with reference to FIGS. 14 to 16.

Figure 14:
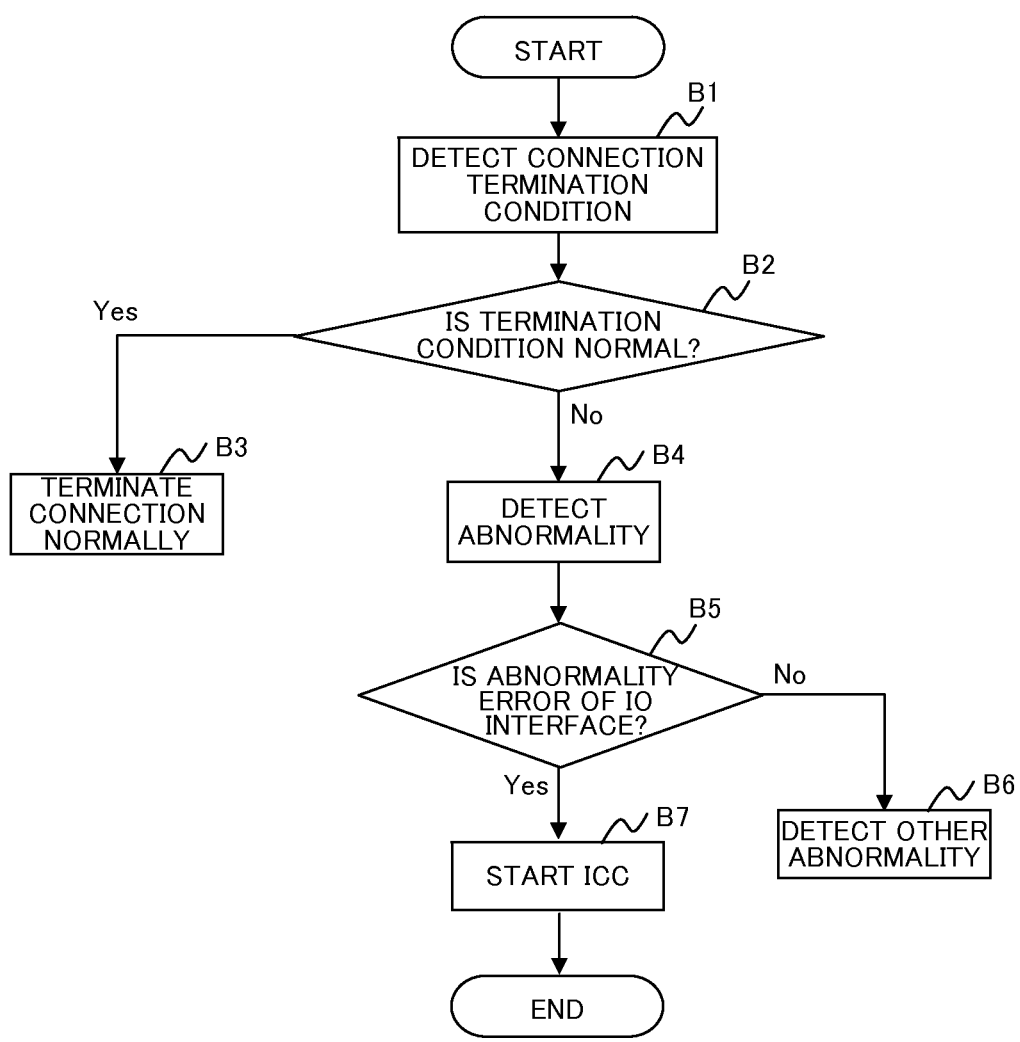
FIG. 14 is a flowchart for describing a processing procedure of a channel of the present embodiment when the channel is in a connection state with an IO device.
Figure 15:
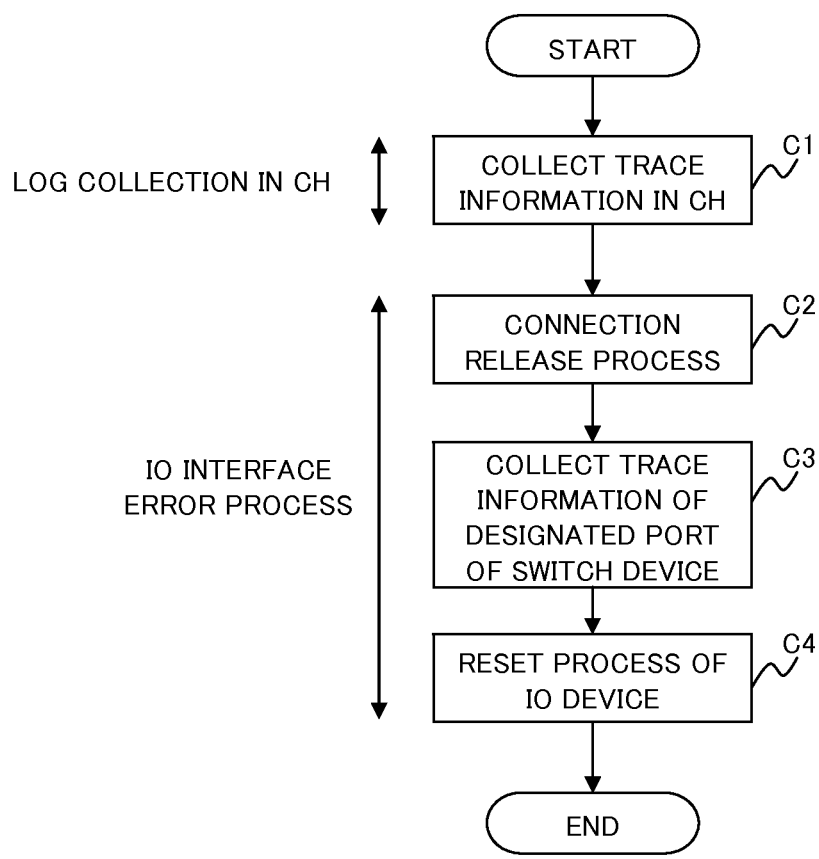
FIG. 15 is a flowchart for describing an error processing procedure of an IO interface in a channel according to the present embodiment.

FIG. 14 is a flowchart for describing a processing procedure of the channel 3 of the present embodiment when the channel 3 is in the connection state with the IO device 4, and FIG. 15 is a flowchart for describing an error processing procedure of an IO interface in the channel 3. FIG. 16 is a flowchart for describing an error log collection procedure in the control device 9 of the present embodiment.

As illustrated in FIG. 14, when the channel 3 that is in the connection state with the IO device 4 detects a connection termination condition by receiving a command from the IO device 4 (step B1), it is determined whether the detected termination condition is normal (step B2).

When it is determined that the detected termination condition is normal as a result of comparison (a Yes route in step B2), a connection between the channel 3 and the IO device 4 ends normally (step B3). However, when it is determined that the detected termination condition is not normal (a No route in step B2), abnormality is detected in the channel 3 (step B4), and it is determined whether the detected abnormality is an IO interface error (step B5).

When it is determined that the detected abnormality is not the IO interface error (a No route in step B5), the channel 3 determines that another abnormality has been detected (step B6), and performs a predetermined process.

Meanwhile, when it is determined that the detected abnormality is an IO interface error (a Yes route in step B5), the channel 3 starts an ICC (step B7). Note that, the process of steps B1 to B7 performed by the channel 3 corresponds to the process of steps S1 and S2 of FIGS. 2 and 6.

Then, as illustrated in FIG. 15, the channel 3 collects its own trace information (step C1 and step S3 of FIGS. 2 and 6).

Then, the connection release process is performed between the channel 3 and the IO device 4 of the communication counterpart of the channel 3 (step C2 and step S4 of FIGS. 2 and 6).

Then, the channel 3 issues the log collection command in which a number of the collection target port is designated to the control device 9, and collects trace information of the external port 6 of the path in which an error has occurred (step C3 and step S5 of FIGS. 2 and 6).

Lastly, the channel 3 issues the reset command to the device 4 of the communication counterpart, and performs the reset process of the IO device 4 (step C4 and step S6 of FIGS. 2 and 6).

Next, a process of the control device 9 based on the log collection command will be described.

Figure 16:
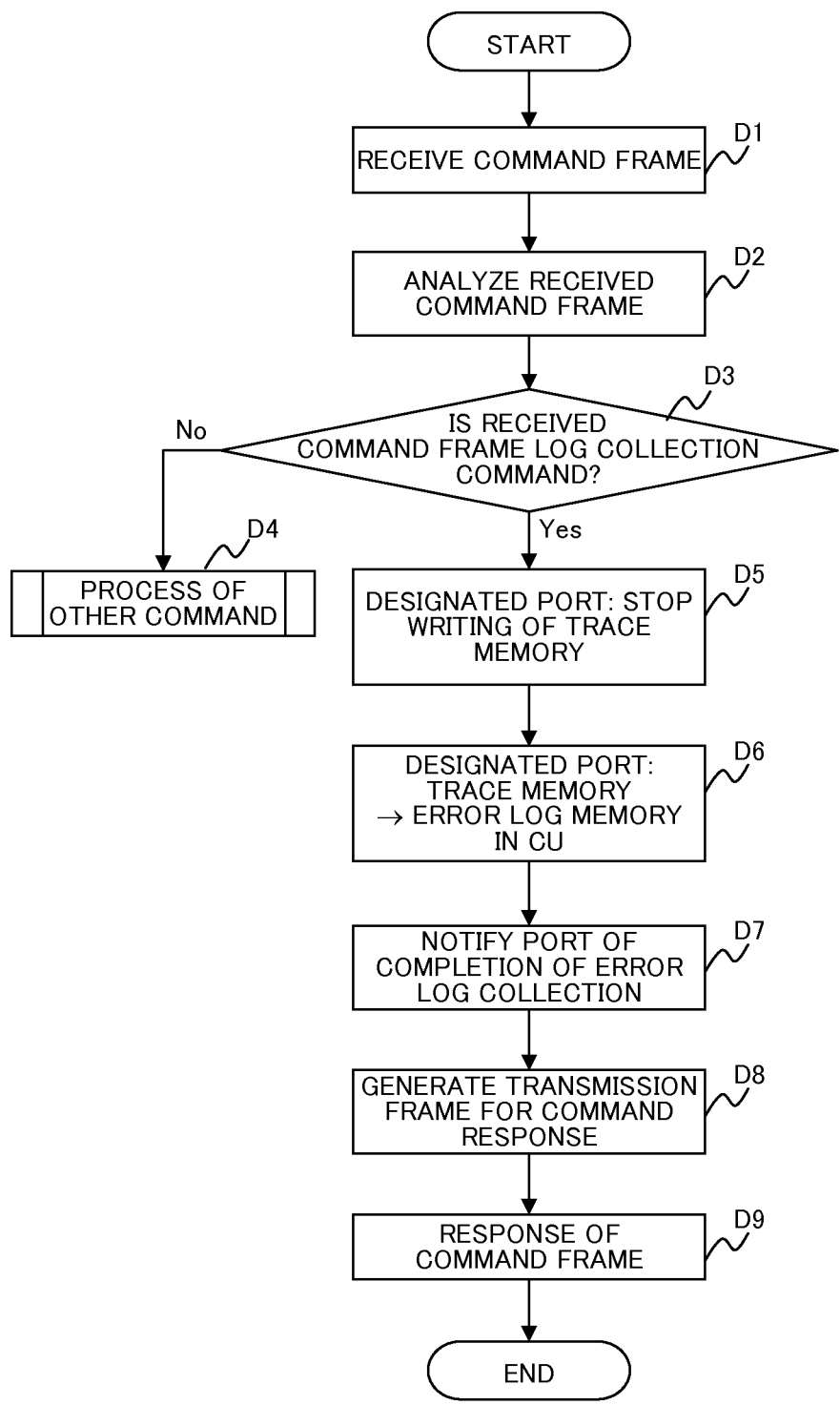
FIG. 16 is a flowchart for describing an error log collection process in a control device of the present embodiment.

As illustrated in FIG. 16, when a command frame is received from the channel 3 through the external port 6 and the switch unit 8 (step D1), the control device 9 analyzes the received command frame (step D2). Then, the control device 9 determines whether the received command frame is the log collection command (step D3).

When it is determined that the received command frame is not the log collection command (a No route in step D3), the control device 9 performs another command process (step D4).

However, when it is determined that the received command frame is the log collection command (a Yes route in step D3), the control device 9 instructs the collection target port designated by the log collection command to stop writing of a trace to a trace memory of the collection target port (step D5).

Then, the control device 9 copies the trace information of the collection target port to the error log memory of the control device 9 (step D6), and notifies the collection target port of the error log collection completion (step D7).

Further, the control device 9 generates a frame used to transmit the response command to the log collection command (step D8; see FIG. 7C). In the response command, the trace information of the collected collection target port is set as an error log. Then, the generated command frame is transmitted from the control device 9 to the channel 3 through the switch unit 8 and the external port 6 (step D9).

Thus, the process performed by the control device 9 based on the log collection command is completed.

As described above, according to the information processing system 1 according to the present embodiment described in sections [1-2] to [1-4], the same effects as the effects of section [1-1] can be obtained.

Further, according to the collection target port of the present embodiment, a period of time until the control device 9 collects a log of the collection target port after the connection release process is performed or a period of time until a predetermined period of time elapses by the time monitoring by the monitoring timer 68 after the connection release process is performed may be set as the log collection period of time in which the connection request from the port 6 other than the collection target port is rejected.

In other words, when the log collection command is issued, until the control device 9 collects a log of the collection target port, content of trace information of an error occurrence in the collection target port can be prevented from being overwritten with interaction of a connection from the third port. Further, after the time monitoring by the monitoring timer 68 times out, reception of the connection request from the third port to the collection target port is allowed, and thus even when the channel 3 does not issue the log collection command, the collection target port can be usefully used.

Further, according to the switch unit 8 of the present embodiment, the busy response can be transmitted based on the port status value of the port status storage unit 82 in response to the connection request transmitted from the third port to the collection target port during the log collection period of time. Thus, trace information when an error occurs can be prevented from being overwritten with interaction of a connection with the third port, and the channel 3 can reliably collect trace information of the collection target port based on the log collection command.

[1-5] Exemplary Configurations of Channel, External Port, and Control Device

[1-5-1] Exemplary Configuration of Channel

Figure 18:
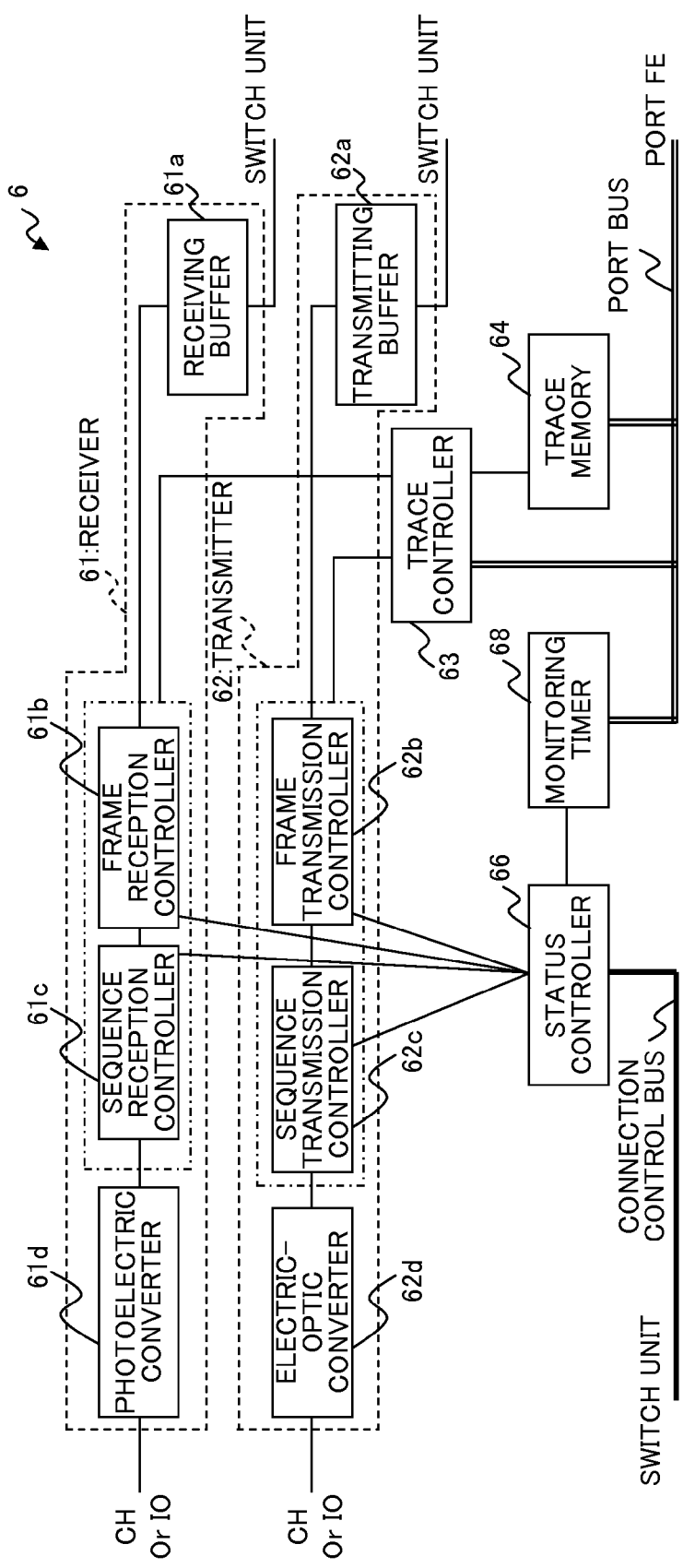
FIG. 18 is a diagram illustrating an exemplary configuration of functional blocks of a port related to a process related to a trace of an IO interface according to the present embodiment.
Figure 19:
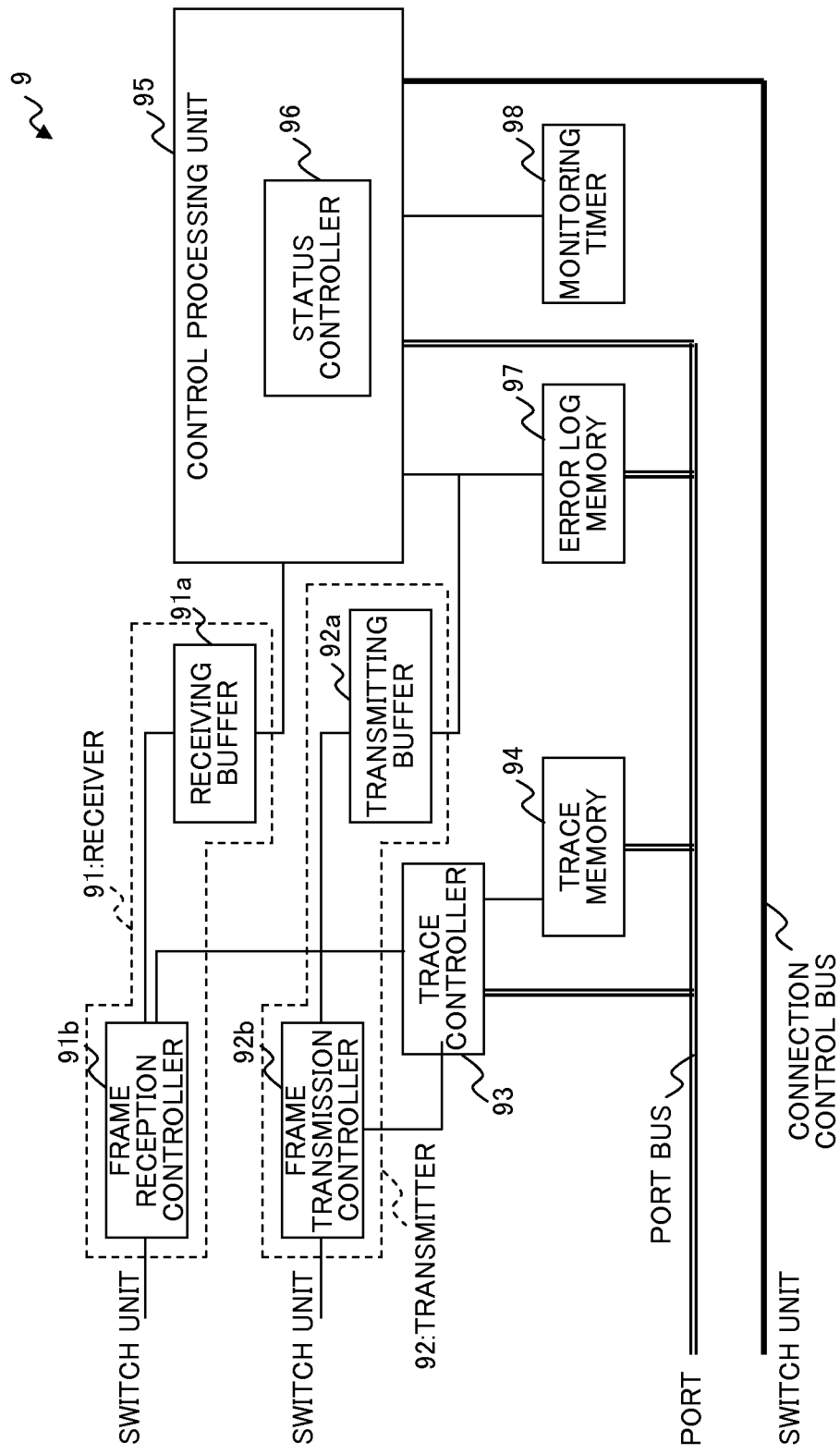
FIG. 19 is a diagram illustrating an exemplary configuration of functional blocks of a control device related to an error log collection process according to the present embodiment.
Figure 20:
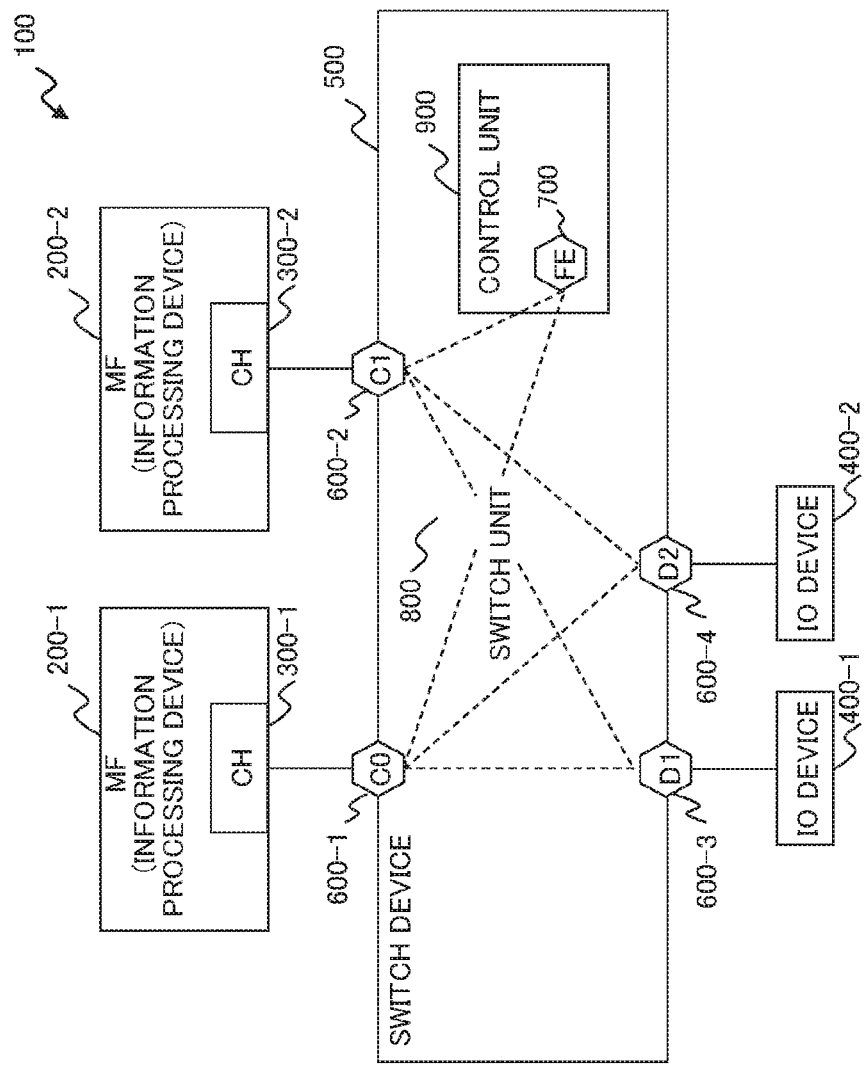
FIG. 20 is a diagram illustrating an exemplary configuration of an information processing system.
Figure 21:
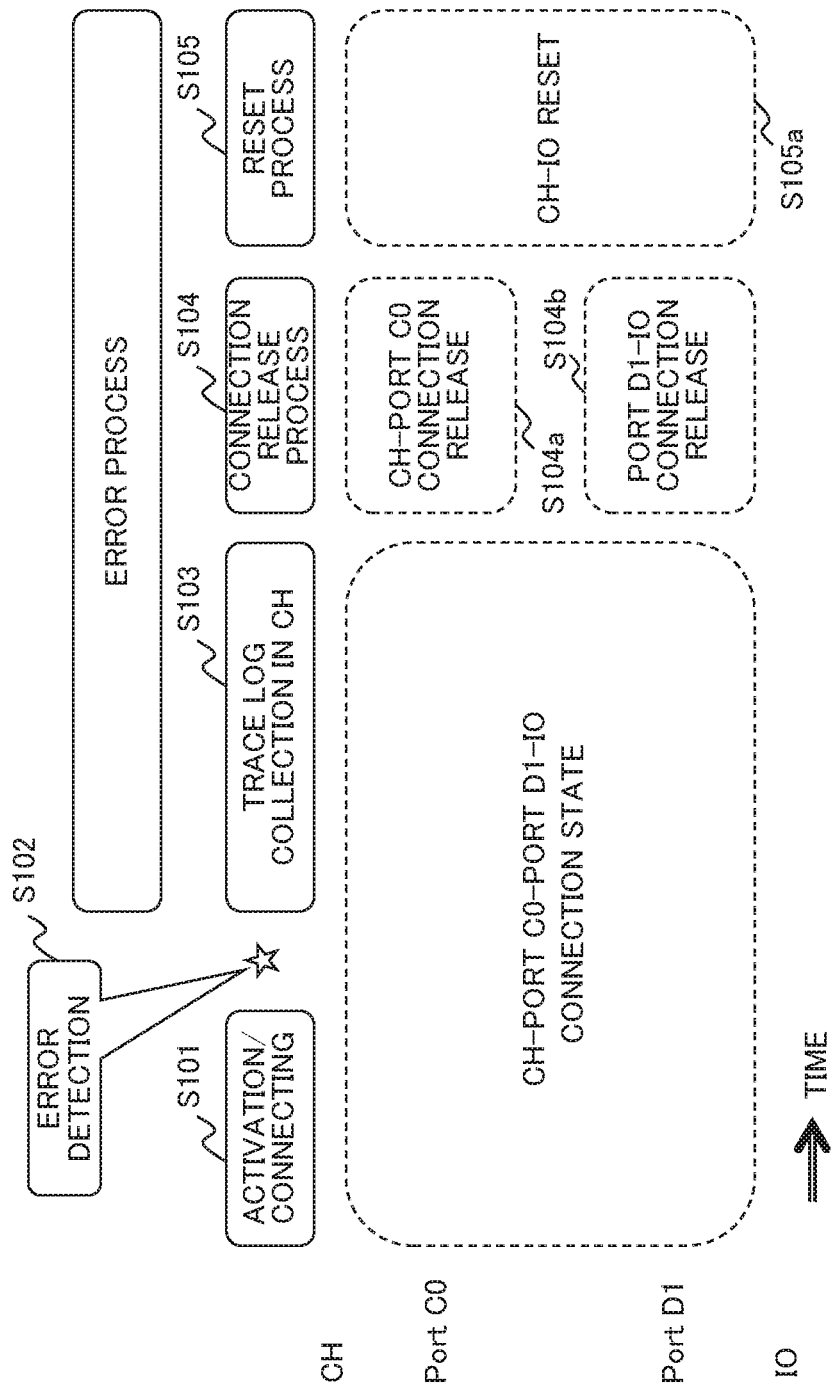
FIG. 21 is a sequence diagram for describing an exemplary error processing procedure in an information processing system illustrated in FIG. 20.

Next, exemplary configurations of the channel 3, the external port 6, and the control device 9 for implementing an error process method of the present embodiment will be described. Note that, FIG. 17 is a diagram illustrating an exemplary configuration of functional blocks of the channel 3 related to an error process of an IO interface, FIG. 18 is a diagram illustrating an exemplary configuration of functional blocks of the port 6 related to a process related to a trace of an IO interface, and FIG. 19 is a diagram illustrating an exemplary configuration of functional blocks of the control device 9 related to an error log collection process.

Figure 17:
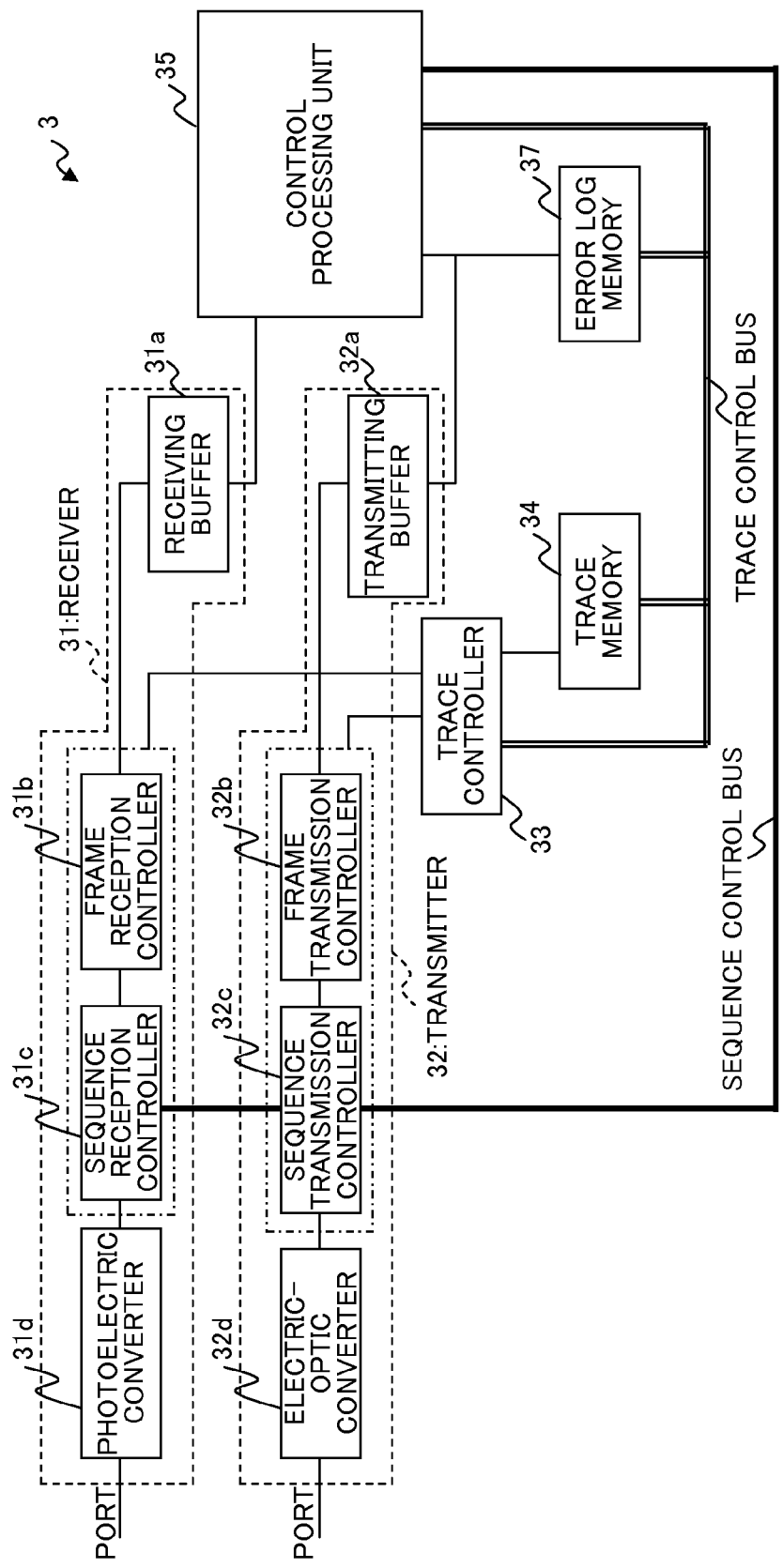
FIG. 17 is a diagram illustrating an exemplary configuration of functional blocks of a channel related to an error process of an IO interface according to the present embodiment.

As illustrated in FIG. 17, as an example of the present embodiment, the channel 3 includes a receiver 31, a transmitter 32, a trace controller 33, a trace memory 34, a control processing unit 35, and an error log memory 37.

The receiver 31 receives a sequence or a command frame from the external port 6 of the switch device 5 connected therewith, and includes a receiving buffer 31a, a frame reception controller 31b, a sequence reception controller 31c, and a photoelectric converter 31d.

The photoelectric converter 31d converts a sequence or a command frame input as an optical signal from the external port 6 into an electrical signal.

When a sequence is received from the external port 6, the sequence reception controller 31c performs a process related to reception on the received sequence, for example, the UDR sequence or the IDLE sequence from the external port 6, and outputs the processed sequence to the receiving buffer 31a at the subsequent stage. Note that, the sequence may be output directly to the control processing unit 35 through a sequence control bus rather than the receiving buffer 31a.

When a command frame is received from the external port 6, the frame reception controller 31b performs a process related to reception on the received command, and outputs the processed command to the receiving buffer 31a at the subsequent stage. Note that, examples of the command frame received by the frame reception controller 31b include a command transmitted from the IO device 4 through the external port 6 and a response command which is transmitted from the control device 9 through the external port 6 in response to a log collection command.

The receiving buffer 31a temporarily stores a sequence or a command frame received from the external port 6.

The transmitter 32 transmits a sequence or a command frame to the external port 6 of the switch device 5 connected therewith, and includes a transmitting buffer 32a, a frame transmission controller 32b, a sequence transmission controller 32c, and an electric-optic converter 32d.

The transmitting buffer 32a temporarily stores a sequence or a command frame to be transmitted to the external port 6.

The frame transmission controller 32b performs a process related to transmission on a command frame stored in the transmitting buffer 32a, and transmits the processed command frame to the external port 6. Note that, examples of the command frame to be transmitted by the frame transmission controller 32b include a command to be transmitted to the IO device 4 through the external port 6 and a log collection command to be transmitted to the control device 9 through the external port 6.

The sequence transmission controller 32c performs a process related to transmission on a sequence stored in the transmitting buffer 32a, for example, UD sequence or the IDLE sequence, and outputs the processed sequence to the external port 6. Note that, the sequence transmission controller 32c may transmit a sequence input from the control processing unit 35 through the sequence control bus.

The electric-optic converter 32d converts an electrical signal input from the frame transmission controller 32b and the sequence transmission controller 32c as a sequence or a command frame into an optical signal, and transmits the optical signal to the external port 6.

Note that, when communication between the channel 3 and the external port 6 is performed through an electrical signal, the photoelectric converter 31d and the electric-optic converter 32d may not be disposed.

The trace controller 33 stores content of a sequence and a frame which have been subjected to reception control or transmission control in the frame reception controller 31b, the sequence reception controller 31c, the frame transmission controller 32b, and the sequence transmission controller 32c in the trace memory 34 as trace information.

Note that, for example, a volatile memory such as a high speed RAM may be used as the trace memory 34.

The control processing unit 35 is connected to the information processing device 2 (not illustrated), transmits a sequence or a command from the transmitter 32 to the external port 6, and performs a predetermined process on a sequence or a command received by the receiver 31.

For example, the control processing unit 35 performs a process of generating an activation command in which the IO device 4 of the connection target is designated based on the instruction from the information processing device 2 and outputting the command to the transmitter 32. Further, the control processing unit 35 performs a process of outputting data included in a command received from the IO device 4 of the connection target to the information processing device 2.

Further, when an ICC is detected on the command received by the receiver 31, the control processing unit 35 causes the trace controller 33 to perform the process of storing (copying) the trace information stored in the trace memory 34 in (to) the error log memory 37 through the trace control bus. Note that, the process of storing the trace information in the trace memory 34 in the error log memory 37 may be performed by the trace controller 33 that has received a sweeping instruction from the control processing unit 35.

Note that, as the error log memory 37, a non-volatile memory such as a flash memory or an electrically erasable programmable read-only memory (EEPROM) may be used, and a volatile memory such as a RAM may be also used.

Further, when the trace information is stored in the error log memory 37, the control processing unit 35 causes the sequence transmission controller 32c to output the UD sequence to release a connection with a transmission counterpart (for example, the IO device 4) of a command in which an ICC is detected through the sequence control bus.

Further, when completion of the connection release process is detected by reception of the UDR sequence, the control processing unit 35 generates the log collection command in which the external port 6 that has performed the connection release is designated as the collection target port, and outputs the log collection command to the frame transmission controller 32b.

When the response command to the log collection command is received from the control device 9 of the switch device 5, the control processing unit 35 may store the trace information of the collection target port stored in DATA of the response command in the error log memory 37 in association with a number of the collection target port.

Note that, when the response command is received, the control processing unit 35 outputs the reset command for the IO device 4 of the connection counterpart to the frame transmission controller 32b.

For example, the trace information of the channel 3 and the collection target port serving as an error log is transmitted to the information processing device 2 and used for error analysis or the like in the control processing unit 35 or/and the information processing device 2.

[1-5-2] Exemplary Configuration of External Port

As illustrated in FIG. 18, as an example of the present embodiment, the external port 6 includes a receiver 61, a transmitter 62, a trace controller 63, a trace memory 64, a status controller 66, and the monitoring timer 68.

The receiver 61 receives a sequence or a command frame from the channel 3 or the IO device 4 connected therewith, and includes a receiving buffer 61a, a frame reception controller 61b, a sequence reception controller 61c, and a photoelectric converter 61d.

The transmitter 62 transmits a sequence or a command frame to the channel 3 or the IO device 4 connected therewith, and includes a transmitting buffer 62a, a frame transmission controller 62b, a sequence transmission controller 62c, and an electric-optic converter 62d.

Note that, the receiving buffer 61a, the transmitting buffer 62a, the photoelectric converter 61d, and the electric-optic converter 62d have the same configurations as described in the channel 3 described above, and thus a description thereof will not be repeated.

Note that, each of an output side of the receiving buffer 61a and an input side of the transmitting buffer 62a is connected to another external port 6 or another internal port 7 through the switch unit 8.

When a sequence is received from the channel 3 or the device 4, the sequence reception controller 61c performs a process related to reception on the received sequence such as the UD sequence, the UDR sequence, or the IDLE sequence, and outputs the processed sequence to the receiving buffer 61a at the subsequent stage.

When a command frame is received from the channel 3 or the IO device 4, the frame reception controller 61b performs a process related to reception on the received command, and outputs the processed command to the receiving buffer 61a at the subsequent stage. Note that, examples of the command frame received by the frame reception controller 61b include various commands including the log collection command transmitted from the channel 3 and a command transmitted from the IO device 4.

The frame transmission controller 62b performs a process related to transmission on a command frame stored in the transmitting buffer 62a, and outputs the processed command to the channel 3 or the IO device 4. Note that, examples of the command frame transmitted by the frame transmission controller 62b include a command transmitted from the IO device 4 to the channel 3 and a response command transmitted from the control device 9 in response to the log collection command.

The sequence transmission controller 62c performs a process related to transmission on a sequence such as the UD sequence, the UDR sequence, or the IDLE sequence stored in the transmitting buffer 62a, and transmits the processed sequence to the channel 3 or the IO device 4.

The trace controller 63 stores content of a sequence and frame which have been subjected to reception control or transmission control in the frame reception controller 61b, the sequence reception controller 61c, the frame transmission controller 62b, and the sequence transmission controller 62c in the trace memory 64 as trace information.

Note that, for example, a volatile memory such as a high speed RAM may be used as the trace memory 64.

Further, when a storage stop instruction for stopping storage of trace information to the trace memory 64 is received from the control device 9 through the port bus, the trace controller 63 can stop storage of trace information to the trace memory 64.

Further, the trace information stored in the trace memory 64 is collected by the control device 9 through the port bus, and stored (copies) in (to) an error log memory 97 as an error log. Thus, the control device 9 can collect the trace information of the collection target port designated in the log collection command received from the channel 3. Note that, the trace information of the port 6 may be transmitted to the control device 9 by the trace controller 63 in association with a port number of the port 6.

The status controller 66 controls the port status value stored in the port status storage unit 82 based on content of sequence and frame which have been subjected to reception control or transmission control in the frame reception controller 61b, the sequence reception controller 61c, the frame transmission controller 62b, and the sequence transmission controller 62c.

For example, the status controller 66 may be configured to set "1" to a bit of "C" of the port status value and set a number of the port 6 of the connection counterpart to a bit of "DPN" via the connection control bus when an activation command is received from the channel 3 or the external port 6 at the channel 3 side, or when the command is transmitted to the external port 6 at the IO device 4 side or the IO device 4.

Further, the status controller 66 may be configured to set "0" to a bit of "B" of the port status value via the connection control bus when the UD sequence is received or has been received in the error process. Thus, the connection release process is performed in its own port 6.

Further, the status controller 66 may be configured to set "1" to a bit of "RB" of the port status value via the connection control bus when the UD sequence, the UDR sequence, or the IDLE sequence is received or has been received in the error process, that is, during the connection release process, or after the connection release process is completed. In other words, during the connection release process or after the connection release process is completed, the status controller 66 can set the recovery busy bit via the connection control bus as the start of the log collection period of time by the control device 9.

Further, the status controller 66 can set "0" to a bit of "RB" of the port status value and release (clear) the recovery busy bit via the connection control bus as the end of the log collection period of time by the control device 9 in response to an instruction from the monitoring timer 68.

The monitoring timer 68 is a timer that performs time monitoring for monitoring completion of error collection, and is configured with a timer circuit or the like. Note that, each external port 6 may not include the monitoring timer 68, and instead, for example, the control device 9 may include a monitoring timer corresponding to each external port 6, or the function of the monitoring timer 68 of each external port 6 may be implemented by a processor in the control device 9.

For example, when the sequence reception controller 61c receives the IDLE sequence, that is, when the connection release process is completed, the monitoring timer 68 starts time monitoring.

Further, when a log collection completion notification is given from the control device 9 via the port bus or when time monitoring times out, the monitoring timer 68 instructs the status controller 66 to clear the recovery busy bit.

[1-5-3] Exemplary Configuration of Control Device

As illustrated in FIG. 19, as an example of the present embodiment, the control device 9 includes a receiver 91, a transmitter 92, a trace controller 93, a trace memory 94, a control processing unit 95, the error log memory 97, and a monitoring timer 98.

The receiver 91 receives a command frame from the switch unit 8 connected therewith, and includes a receiving buffer 91a and a frame reception controller 91b.

The transmitter 92 transmits a command frame to the switch unit 8 connected therewith, and includes a transmitting buffer 92a and a frame transmission controller 92b.

Note that, the receiving buffer 91a and the transmitting buffer 92a have the same configurations as described in the channel 3, and thus a detailed description thereof will not be repeated.

When a command frame is received from the switch unit 8, the frame reception controller 91b performs a process related to reception on the received command, and outputs the processed command to the receiving buffer 91a at the subsequent stage. Note that, as the command frame received by the frame reception controller 91b, for example, there are various kinds of commands including the log collection command which are transmitted from the channel 3 and input through the external port 6 and the switch unit 8.

The frame transmission controller 92b performs a process related to transmission on the command frame from the control device 9 stored in the transmitting buffer 92a, and transmits the processed command frame to the switch unit 8. Note that, as the command frame transmitted by the frame transmission controller 92b, for example, there is a response command to the log collection command from the channel 3.

The trace controller 93 stores content of a frame that has been subjected to reception control or transmission control in the frame reception controller 91b and the frame transmission controller 92b in the trace memory 94 as trace information.

Note that, for example, a volatile memory such as a high-speed RAM is used as the trace memory 94.

Further, when a storage stop instruction for stopping storage of the trace information to the trace memory 94 is received from the control processing unit 95 via the port bus, the trace controller 93 can stop storage of the trace information to the trace memory 94.

Further, the trace information stored in the trace memory 94 is collected by the control processing unit 95 via the port bus and stored (copied) in (to) the error log memory 97 as an error log. Note that, a process of storing the trace information of the trace memory 94 in the error log memory 97 may be performed by the trace controller 93 that has received a trace information collection instruction.

The control processing unit 95 transmits a command frame from the transmitter 92 to the switch unit 8, and performs a predetermined process on a command frame received by the receiver 91.

For example, when the log collection command is received from the channel 3 through the switch unit 8, the control processing unit 95 transmits the storage stop instruction for stopping storage of the trace information to the trace memory 64 or 94 to the log collection target port designated by the log collection command via the port bus. Further, the control processing unit 95 collects the trace information on the log collection target port via the port bus as described above.

Further, when the trace information of each collection target port is stored in the error log memory 97 as an error log via the port bus, the control processing unit 95 transmits the error log to the channel 3. Specifically, as described above, the control processing unit 95 sets the error log stored in the error log memory 97 to DATA of the response command of the log collection command, sets a number of the external port 6 connected to the channel 3 to the designation (DA), and outputs the response command to the transmitting buffer 92a.

Further, when the trace information of each collection target port is stored in the error log memory 97 and the storage stop instruction is transmitted to the log collection target port, the control processing unit 95 instructs the collection target port to start storage of the trace information to the trace memory 64 or 94 via the port bus.

Further, when the trace information of each collection target port is stored in the error log memory 97, the control processing unit 95 instructs the log collection target port to stop the time monitoring by the monitoring timer 68 or 98 via the port bus.

Note that, as the error log memory 97, for example, a non-volatile memory such as a flash memory or an EEPROM is used, but a volatile memory such as a RAM may be used.

Further, the control processing unit 95 includes a status controller 96.

The status controller 96 controls the port status value stored in the port status storage unit 82 based on content of a frame which has been subjected to reception control or transmission control in the frame reception controller 91b and the frame transmission controller 92b, similarly to the status controller 66 of the external port 6.

The monitoring timer 98 is a timer that performs time monitoring for monitoring completion of error collection, and is configured with a timer circuit or the like, similarly to the monitoring timer 68 of the external port 6. Note that, instead of the monitoring timer 98, for example, the function of the monitoring timer 98 may be implemented by a processor in the control device 9.

For example, the monitoring timer 98 starts the time monitoring when the connection release process is completed.

Further, the monitoring timer 98 instructs the status controller 96 to clear the recovery busy bit when a log collection completion notification is given from the control processing unit 95 via the port bus or when the time monitoring times out.

Note that, the control device 9 implements a function of the internal port 7 (the port FE) through the receiver 91, the transmitter 92, the trace controller 93, the trace memory 94, and the monitoring timer 98.

Note that, the transmitter and the receiver in each of the channel 3, the external port 6, and the control device 9 described above with reference to FIGS. 17 to 19 may be integrated into a transceiving unit having both a function of a transmission side and a function of a reception side.

[2] Others

The exemplary embodiment of the present invention has been described above, but the present invention is not limited to the above specific embodiment, and various changes or modification can be made within the scope not departing from the gist of the present invention.

For example, the present embodiment has been described in connection with the example in which the channel 3 issues the log collection command when an error is detected in the state in which the channel 3 is connected with the IO device 4. However, the present invention is not limited to this example, and the log collection command may be issued when an error is detected in the state in which the channel 3 is connected with the internal port 7 (the control device 9).

When an error is detected in the state in which the channel 3 is connected with the internal port 7 (the control device 9), the connection release process with the channel 3 and a setting of the recovery busy bit are performed in the port 6 at the channel 3 side before the log collection command is issued. Further, in the internal port 7, the status controller 96 sets the recovery busy bit. Further, in the external port 6 and the internal port 7, for example, a process of setting a monitoring timer is performed, and the log collection command is transmitted from the channel 3. Note that, for example, a command instructing a connection release may be transmitted by the channel 3 when, before, or after the UD sequence is transmitted to the external port 6 at the channel 3 side, and the status controller 96 may set the recovery busy bit when the internal port 7 receives the command.

Further, in the log collection command according to the present embodiment, the external port 6 at the channel 3 side in which an error is detected and/or the external port 6 at the IO device 4 side which is a communication counterpart of the channel 3 is designated as the collection target port, but the present invention is not limited to this example. For example, another external port 6 other than the external port 6 may be included as the collection target port. In this case, the control device 9 collects the trace information in order, that is, sequentially according to a priority of each collection target port.

Further, in the present embodiment, the log collection command is issued when an error is detected in the channel 3, but the present invention is not limited to this example. For example, when trace information of a predetermined point in time (timing) is collected on a predetermined external port 6 and/or internal port 7, the channel 3 may issue the log collection command in which the predetermined external port 6 and/or internal port 7 is designated as the collection target port. In this case, before the log collection command is issued, it is desirable to perform a process of performing the connection release process of the collection target port, setting the recovery busy bit, setting the monitoring timer, and the like.

Further, in the present embodiment, the recovery busy bit is set by the external port 6 or the internal port 7 during the connection release process, but the present invention is not limited to this example.

The recovery busy bit may be set when before the connection release process is performed, for example, after the channel 3 detects an error, the channel 3 transmits a predetermined command to the external port 6 or the internal port 7.

Further, in the present embodiment, the monitoring timers 68 and 98 start the time monitoring when the connection release process is completed, but the present invention is not limited to this example. For example, the monitoring timers 68 and 98 may start the time monitoring when the status controllers 66 and 96 set "1" to a bit of "RB" of the port status value, that is, when the control device 9 starts the log collection period of time.

Further, in the present embodiment, the log collection period of time ends when the control device 9 collects a log of the collection target port, but the present invention is not limited to this example. The log collection period of time does not end even when the control device 9 collects a log of the collection target port and the log collection period of time may end when a predetermined period of time elapses after the connection release is performed.

The channel 3 includes a processor such as a central processing unit (CPU) or a micro processing unit (MPU) (not illustrated) and a memory (not illustrated), and the channel 3 controls input and output of the information processing device 2 through the processor. Further, the processor executes a predetermined program stored in the memory and implements the function of the control processing unit 35. Note that, the functions of the frame reception controller 31*b*, the sequence reception controller 31*c*, the frame transmission controller 32*b*, the sequence transmission controller 32*c*, and the trace controller 33 may be implemented by hardware (circuit) or may be implemented by executing a predetermined program through the processor.

Similarly, in the control device 9, a processor such as a CPU or an MPU (not illustrated) and a memory (not illustrated) is equipped in the switch device 5, and the processor executes a predetermined program (log collection program) stored in the memory and implements the function of the control processing unit 95. Note that, the functions of the frame reception controller 91*b*, the frame transmission controller 92*b*, the trace controller 93, and the status controller 96 may be implemented by hardware (circuit) or may be implemented by executing a predetermined program through the processor.

Further, in the external port 6, the functions of the frame reception controller 61*b*, the sequence reception controller 61*c*, the frame transmission controller 62*b*, the sequence transmission controller 62*c*, the trace controller 63, and the status controller 66 may be implemented by hardware (circuit) or may be implemented by executing a predetermined program (log collection program) stored in the memory, for example, through the processor of the switch device 5.

Note that, for example, a program (log collection program) for implementing at least the function of the control processing unit 95 may be provided in the form in which the program is recorded in a computer-readable recording medium such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disc, a magnetic disc, an optical disc, or a magneto optical disk. The computer reads the program from the recording medium, transfers the program to be stored in an internal storage device or an external storage device, and uses the program. For example, the program may be recorded in a storage device (recording medium) such as a magnetic disc, an optical disc, or a magneto optical disk and provided from storage device to the computer via a communication line.

When at least the function of the control processing unit 95 is implemented, a program stored in an internal storage device (the memory of the switch device 5 in the present embodiment) is executed by a microprocessor of a computer (the processor of the switch device 5 in the present embodiment). At this time, the program recorded in the recording medium may be read and executed by the computer.

Note that, in the present embodiment, a computer is a concept including hardware and an operating system, and means the hardware operating under control of the operating system. Further, when an operating system is unnecessary and so an application program operates hardware independently, the hardware corresponds to the computer. The hardware includes at least a microprocessor such as a CPU and a device that reads a computer program recorded in a recording medium, and in the present embodiment, the switch device 5 functions as a computer.

According to the technology of the disclosure, it is possible to collect a log of an IO control device useful for log analysis in an information processing system including an IO control device that connects a channel with an IO device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An input output (IO) control device that connects a plurality of devices with each other, the IO control device comprising:
    a plurality of ports to which the plurality of devices are connected;
    a control unit that controls the plurality of ports;
    a storage unit that holds a status of each of the plurality of ports; and
    a switch unit that connects the plurality of ports with each other based on each status held in the storage unit, wherein the control unit collects a log of a collection target port designated by a log collection instruction among the plurality of ports when the log collection instruction is received from any one of the plurality of devices through a first port to which the corresponding device is connected among the plurality of ports, the collection target port sets information representing busy to the storage unit as a status corresponding to the collection target port when a log collection period of time in which the control unit collects a log starts, and the switch unit refers to the status corresponding to the collection target port held in the storage unit when there is a connection request from a port other than the collection target port to the collection target port, and transmits a busy response to the second port when the information representing busy is set to the status.

2. The IO control device according to claim 1, wherein the collection target port rejects reception of a connection request from a port other than the collection target port to the collection target port during the log collection period of time.

3. The IO control device according to claim 1, wherein the log collection instruction is transmitted by the device when a connection release process of the first port and a second port among the plurality of ports is performed in a state in which the first port is connected with the second port.

4. The IO control device according to claim 3, wherein at least one of the first and second ports is included as the collection target port.

5. The IO control device according to claim 3, wherein the log collection period of time is either a period of time until the control unit collects a log of the collection target port after the connection release process is performed or a period of time until a predetermined period of time elapses after the connection release process is performed.

6. The IO control device according to claim 1, wherein the collection target port clears the information representing busy set to the storage unit as the status corresponding to the collection target port when the log collection period of time ends.

7. The IO control device according to claim 1, wherein the control unit transmits a collected log of the collection target port to a device that has given the log collection instruction as a response to the log collection instruction.

8. The IO control device according to claim 1, wherein
the control unit includes an internal port connected to the plurality of ports, and
the collection target port is at least one of the plurality of ports and the internal port.

9. The IO control device according to claim 3, wherein
the device is a channel equipped in an information processing device, and
the second port is connected to an IO device among the plurality of devices.

10. An information processing system, comprising:
a plurality of devices; and
an input output (IO) control device that connects the plurality of devices with each other, wherein
the IO control device includes
a plurality of ports to which the plurality of devices are connected,
a control unit that controls the plurality of ports,
a storage unit that holds a status of each of the plurality of ports, and
a switch unit that connects the plurality of ports with each other based on each status held in the storage unit, the control unit collects a log of a collection target port designated by a log collection instruction among the plurality of ports when the log collection instruction is received from any one of the plurality of devices through a first port to which the corresponding device is connected among the plurality of ports, the collection target port sets information representing busy to the storage unit as a status corresponding to the collection target port when a log collection period of time in which the control unit collects a log starts, and the switch unit refers to the status corresponding to the collection target port held in the storage unit when there is a connection request from a port other than the collection target port to the collection target port, and transmits a busy response to the port other than the collection target port when the information representing busy is set to the status.

11. The information processing system according to claim 10, wherein the collection target port rejects reception of a connection request from a port other than the collection target port to the collection target port during the log collection period of time.

12. The information processing system according to claim 10, wherein the device transmits the log collection instruction when a connection release process of the first port and a second port among the plurality of ports is performed in a state in which the first port is connected with the second port.

13. A computer-readable recording medium having stored therein a log collection program causing a computer serving as an input output (IO) control device that includes a plurality of ports to which a plurality of devices are connected and a control unit that controls the plurality of ports, to execute a process for connecting the plurality of devices with each other, the process comprising:
receiving a log collection instruction from any one of the plurality of devices through a first port to which the corresponding device is connected among the plurality of ports;
collecting a log of a collection target port designated by the received log collection instruction among the plurality of ports;
setting, by the collection target port, information representing busy to a storage unit as a status corresponding to the collection target port when a log collection period of time in which the control unit collects a log starts, the storage unit being configured to hold a status of each of the plurality of ports; and
in a switch unit, configured to connect the plurality of ports with each other based on each status held in the storage unit, referring to the status corresponding to the collection target port held in the storage unit when there is a connection request from a port other than the collection target port to the collection target port, and transmitting a busy response to the port other than the collection target port when the information representing busy is set to the status.

14. The computer-readable recording medium having stored therein a log collection program according to claim 13, further comprising rejecting reception of a connection request from a port other than the collection target port to the collection target port during the log collection period of time.

15. The computer-readable recording medium having stored therein a log collection program according to claim 13, further comprising receiving the log collection instruction when a connection release process of the first port and a second port among the plurality of ports is performed in a state in which the first port is connected with the second port.

16. The computer-readable recording medium having stored therein a log collection program according to claim 15, wherein the log collection period of time is either a period of time until the control unit collects a log of the collection target port after the connection release process is performed or a period of time until a predetermined period of time elapses after the connection release process is performed.

* * * * *